(12) United States Patent
Ozawa et al.

(10) Patent No.: US 11,773,921 B2
(45) Date of Patent: Oct. 3, 2023

(54) POWER TRANSMISSION APPARATUS

(71) Applicant: Kabushiki Kaisha F.C.C., Hamamatsu (JP)

(72) Inventors: Yoshihiko Ozawa, Hamamatsu (JP); Han Hiong Chen, Hamamatsu (JP); Katsu Yoshimoto, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 18/019,334

(22) PCT Filed: Jul. 29, 2021

(86) PCT No.: PCT/JP2021/028050
§ 371 (c)(1),
(2) Date: Feb. 2, 2023

(87) PCT Pub. No.: WO2022/030350
PCT Pub. Date: Feb. 10, 2022

(65) Prior Publication Data
US 2023/0279908 A1    Sep. 7, 2023

(30) Foreign Application Priority Data
Aug. 6, 2020  (JP) ................................ 2020-134039

(51) Int. Cl.
*F16H 21/08* (2006.01)
*F16D 21/08* (2006.01)
(Continued)

(52) U.S. Cl.
CPC ............. *F16D 21/08* (2013.01); *F16D 13/52* (2013.01); *F16D 43/12* (2013.01)

(58) Field of Classification Search
CPC ........... F16D 21/08; F16D 13/52; F16D 43/12
See application file for complete search history.

(56) References Cited

U.S. PATENT DOCUMENTS 8,210,333 B2 * 7/2012 Inomori ................ F16D 25/086
                                                        192/85.5
8,844,698 B2 * 9/2014 Miyazaki ................ F16D 43/10
                                                        192/96
(Continued)

FOREIGN PATENT DOCUMENTS

JP   2005-220929 A   8/2005
JP   2009-063023 A   3/2009
(Continued)

OTHER PUBLICATIONS

Official Communication issued in International Patent Application No. PCT/JP2021/028050, dated Sep. 7, 2021.

*Primary Examiner* — Stacey A Fluhart
*Assistant Examiner* — Farhana Pervin
(74) *Attorney, Agent, or Firm* — KEATING AND BENNETT, LLP

(57) ABSTRACT

In a power transmission apparatus, a second clutch includes a divider dividing driving clutch plates and driven clutch plates in an axial direction such that a first region adjacent to a clutch pressure plate and a second region adjacent to a centrifugal clutch are defined. The second clutch presses the driving clutch plates and the driven clutch plates in the first region and the second region against each other during operation of the centrifugal clutch, and presses the driving clutch plates and the driven clutch plates in the first region against each other during operation of a back torque transmission cam.

7 Claims, 22 Drawing Sheets

(51) Int. Cl.
 *F16D 13/52* (2006.01)
 *F16D 43/12* (2006.01)

(56) References Cited

U.S. PATENT DOCUMENTS

| | | | |
|---|---|---|---|
| 2005/0000775 A1* | 1/2005 | Drussel | F16D 43/12 |
| | | | 192/105 B |
| 2005/0167229 A1 | 8/2005 | Tsukada et al. | |
| 2009/0127054 A1* | 5/2009 | Inomori | F16D 43/12 |
| | | | 192/70.11 |
| 2010/0107810 A1* | 5/2010 | Saitoh | F16D 13/04 |
| | | | 74/664 |
| 2015/0337910 A1* | 11/2015 | Yoshimoto | F16D 43/12 |
| | | | 192/70.27 |
| 2019/0226576 A1* | 7/2019 | Guarino | F16D 13/52 |
| 2019/0285125 A1* | 9/2019 | Imanishi | F16D 13/52 |
| 2019/0376566 A1* | 12/2019 | Tsuzuki | F16D 25/082 |
| 2020/0232520 A1 | 7/2020 | Ozawa et al. | |

FOREIGN PATENT DOCUMENTS

| | | |
|---|---|---|
| JP | 2017-155883 A | 9/2017 |
| JP | 2019-044870 A | 3/2019 |

* cited by examiner

POWER TRANSMISSION APPARATUS

BACKGROUND OF THE INVENTION

1. Field of the Invention

The present invention relates to a power transmission apparatus that is able to freely transmit a rotational force of an input to an output or cut off the rotational force.

2. Description of the Related Art

Usually, a power transmission apparatus included in a motorcycle freely transmits a driving force of an engine to a transmission and a driving wheel or cuts off the driving force. Such a power transmission apparatus includes an input member connected to an engine, an output member connected to a transmission and a driving wheel, a clutch member connected to the output member, and a pressure member that is able to move toward or away from the clutch member. Moving the pressure member toward the clutch member presses driving and driven clutch plates against each other so as to transmit power therebetween. Moving the pressure member away from the clutch member releases a pressing force exerted on the driving and driven clutch plates so as to cut off transmission of the power therebetween.

As disclosed, for example, in JP 2019-44870 A, a power transmission apparatus known in the art includes a back torque transmission cam that is able to, when a pressure member is located at a non-operating position, move a second clutch member so as to press driving and driven clutch plates against each other upon reception of a rotational force by a first clutch member through an output member. The power transmission apparatus known in the art is able to transmit a rotational force of a wheel to an engine so as to apply an engine brake.

SUMMARY OF THE INVENTION

The power transmission apparatus known in the art, however, has a low degree of flexibility in setting the angles of cam surfaces that define the back torque transmission cam. This unfortunately makes it difficult to freely change transmission capacity during application of an engine brake. In one example, the number of driving clutch plates and the number of driven clutch plates may be changed so as to freely change transmission capacity during application of an engine brake. This, however, results in an undesirable change in transmission capacity during acceleration.

Preferred embodiments of the present invention provide power transmission apparatuses each able to freely change transmission capacity during application of an engine brake without any change in transmission capacity during acceleration.

According to a preferred embodiment of the present invention, a power transmission apparatus includes a clutch housing rotatable together with an input that rotates with a driving force of an engine of a vehicle, the clutch housing having a plurality of driving clutch plates attached thereto, a clutch including a first clutch and a second clutch, the first clutch being connected to an output that is able to rotate a wheel of the vehicle, the second clutch having a plurality of driven clutch plates attached thereto, the driven clutch plates being arranged alternately with the driving clutch plates attached to the clutch housing, a clutch pressure plate movable between an operating position where the driving and driven clutch plates are pressed against each other so as to enable transmission of the driving force of the engine to the wheel and a non-operating position where a pressing force exerted on the driving and driven clutch plates is released so as to cut off transmission of the driving force of the engine to the wheel, a centrifugal clutch including a weight movable from a radially inner position to a radially outer position with centrifugal force produced by rotation of the clutch housing, the centrifugal clutch being operable to, when the weight is located at the radially outer position, press the driving and driven clutch plates against each other so as to enable transmission of the driving force of the engine to the wheel, the centrifugal clutch being operable to, when the weight is located at the radially inner position, release the pressing force exerted on the driving and driven clutch plates so as to cut off transmission of the driving force of the engine to the wheel, and a back torque transmission cam operable to, when the clutch pressure plate is located at the non-operating position, move the second clutch so as to press the driving and driven clutch plates against each other upon reception of a rotational force by the first clutch through the output. The second clutch includes a divider dividing the driving and driven clutch plates in an axial direction such that a first region adjacent to the clutch pressure plate and a second region adjacent to the centrifugal clutch are defined. The second clutch is operable to press the driving and driven clutch plates in the first region and the second region against each other during operation of the centrifugal clutch, and press the driving and driven clutch plates in the first region against each other during operation of the back torque transmission cam.

When the centrifugal clutch is in operation and the back torque transmission cam is not in operation, the centrifugal clutch and the clutch pressure plate may produce a pressing force by which the driving and driven clutch plates in the first region and the second region are pressed against each other, and when the back torque transmission cam is in operation and the centrifugal clutch is not in operation, the divider and the clutch pressure plate may produce a pressing force by which the driving and driven clutch plates in the first region are pressed against each other.

A location of the divider on the second clutch may be set in accordance with a transmission capacity of the driving clutch plates or the driven clutch plates in the first region and a transmission capacity of the driving clutch plates or the driven clutch plates in the second region.

A number of driving clutch plates in the second region may be one.

According to a preferred embodiment of the present invention, the second clutch includes the divider dividing the driving and driven clutch plates in the axial direction such that the first region adjacent to the clutch pressure plate and the second region adjacent to the centrifugal clutch are defined. The second clutch presses the driving and driven clutch plates in the first region and the second region against each other during operation of the centrifugal clutch. The second clutch presses the driving and driven clutch plates in the first region against each other during operation of the back torque transmission cam. Consequently, the present preferred embodiment is able to freely change transmission capacity during application of an engine brake without any change in transmission capacity during acceleration.

According to a preferred embodiment of the present invention, when the centrifugal clutch is in operation and the back torque transmission cam is not in operation, the centrifugal clutch and the clutch pressure plate produce a pressing force by which the driving and driven clutch plates in the first region and the second region are pressed against each other. When the back torque transmission cam is in operation and the centrifugal clutch is not in operation, the divider and the clutch pressure plate produce a pressing force by which the driving and driven clutch plates in the first region are pressed against each other. The second clutch includes the divider defined by a flange located at any desired position. Consequently, the present preferred embodiment is able to freely change transmission capacity during application of an engine brake without any change in transmission capacity during acceleration.

According to a preferred embodiment of the present invention, the location of the divider on the second clutch is set in accordance with the transmission capacity of the driving clutch plates or the driven clutch plates in the first region and the transmission capacity of the driving clutch plates or the driven clutch plates in the second region. Consequently, the present preferred embodiment is able to accurately set transmission capacity during acceleration of the vehicle and transmission capacity during application of an engine brake.

According to a preferred embodiment of the present invention, a number of the driving clutch plates in the second region is one. Consequently, the present preferred embodiment enables a smooth connection of the centrifugal clutch to the driving clutch plates or the driven clutch plates in the first region through the driving clutch plate in the second region during operation of the centrifugal clutch.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 18:
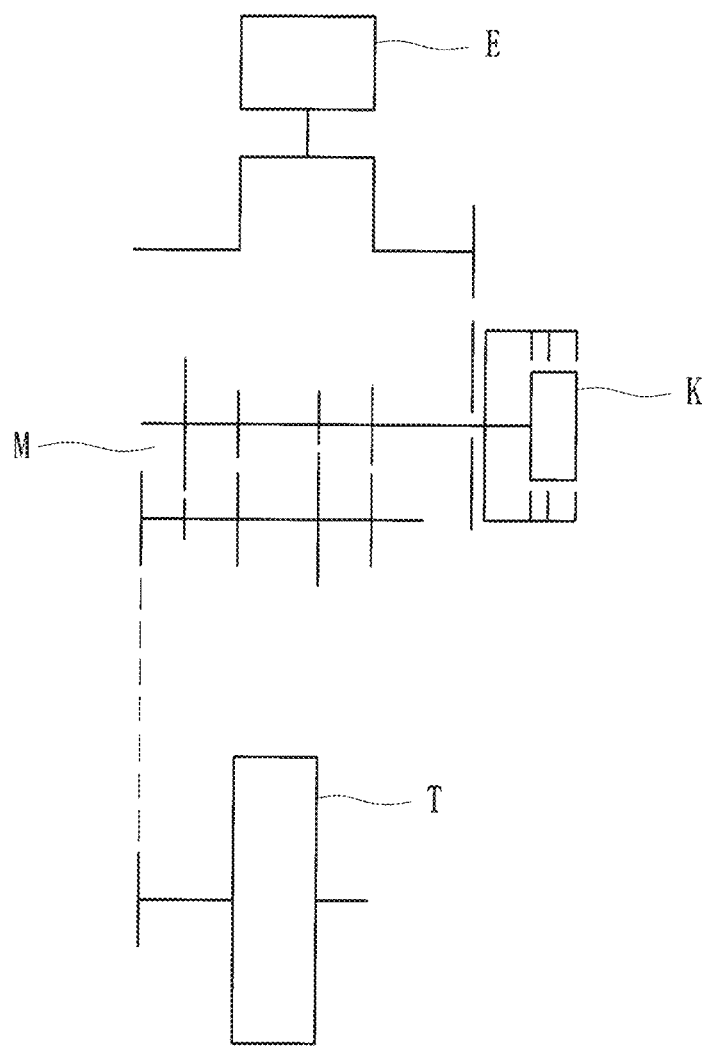
FIG. 18 is a schematic diagram of a vehicle in which the power transmission apparatus is used.

Preferred embodiments of the present invention will be described below in detail with reference to the drawings. As illustrated in FIG. 18, a power transmission apparatus K according to the present preferred embodiment is disposed in a vehicle so as to freely transmit a driving force of an engine E to a driving wheel T through a transmission M or cut off the driving force. As illustrated in FIGS. 1 to 16, the power transmission apparatus K includes a clutch housing 2 provided with an input gear 1 (which is an input) that rotates with the driving force of the engine E of the vehicle, an output shaft 3 (which is an output) connected to the transmission M, a clutch (which includes a first clutch 4a and a second clutch 4b), a clutch pressure plate 5, a plurality of driving clutch plates (6a, 6b), a plurality of driven clutch plates (7a, 7b), a centrifugal clutch 9 including weights 10, an auxiliary clutch plate 17, and a back torque transmission cam (which includes cam surfaces K1 and K2).

The input gear 1 is rotatable around the output shaft 3 upon receiving a driving force (or a rotational force) transmitted from the engine E. The input gear 1 is connected to the clutch housing 2 with a fastener, such as a rivet. The clutch housing 2 is a cylindrical structure with an opening defined at its right end in FIG. 2 and is connected to the input gear 1. The clutch housing 2 is rotatable together with rotation of the input gear 1 with the driving force of the engine E.

Figure 4:
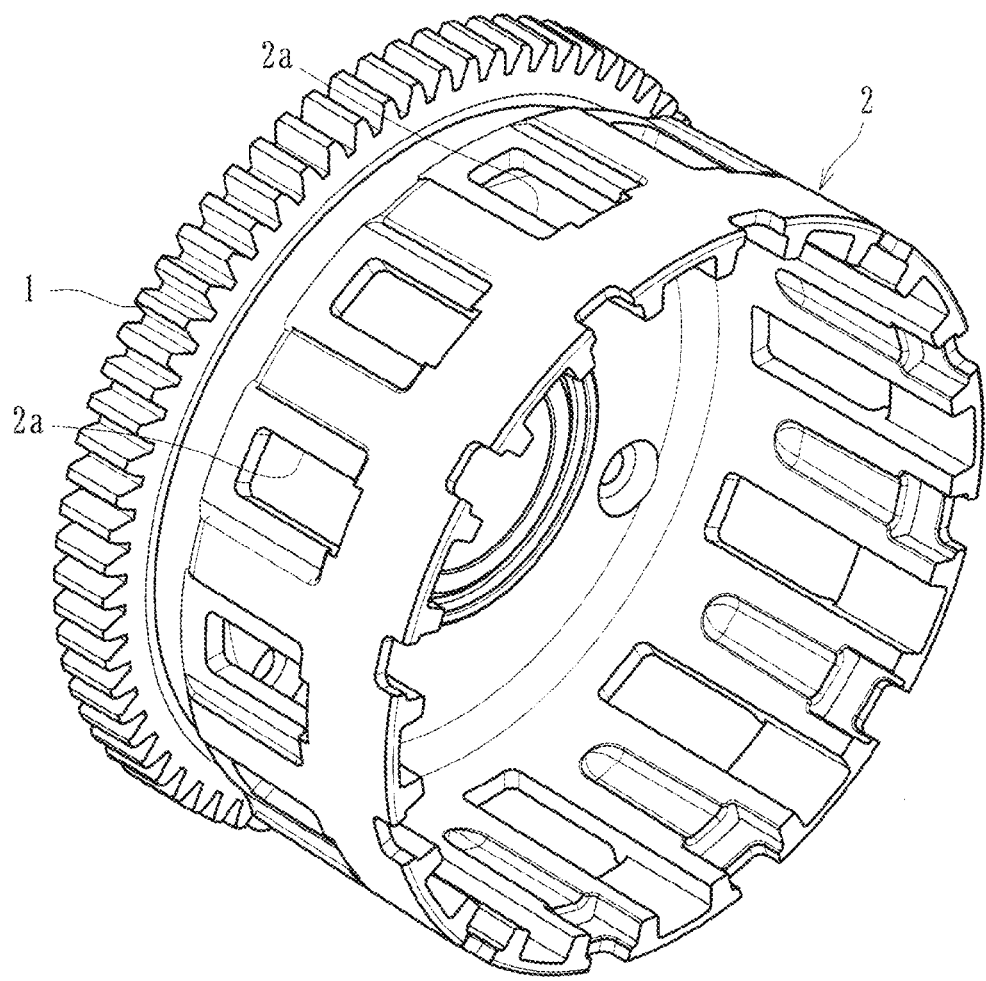
FIG. 4 is a perspective view of a clutch housing of the power transmission apparatus.

As illustrated in FIG. 4, the clutch housing 2 is circumferentially provided with a plurality of cut-outs 2a. The driving clutch plates (6a to 6c) are fitted to the cut-outs 2A and thus attached to the clutch housing 2. The driving clutch plates (6a to 6c) are each made of a substantially annular plate material. The driving clutch plates (6a to 6c) are rotatable together with rotation of the clutch housing 2 and slidable in an axial direction (which corresponds to a right-left direction in FIG. 2). The driving clutch plates 6a and 6c are attached to the clutch housing 2 so as to be adjacent to the second clutch 4b. The driving clutch plate 6b is attached to the clutch housing 2 so as to be adjacent to the clutch pressure plate 5.

The driven clutch plates 7a and 7c are attached to the clutch (which includes the first clutch 4a and the second clutch 4b). The driven clutch plates 7a and 7c are arranged alternately with the driving clutch plates 6a and 6c attached to the clutch housing 2. The clutch is connected to the output shaft 3 (i.e., the output), which is able to rotate the driving wheel T through the transmission M of the vehicle. The clutch includes two components (i.e., the first clutch 4a connected to the output and the second clutch 4b having the driven clutch plates 7a and 7c attached thereto) assembled to each other.

Figure 5:
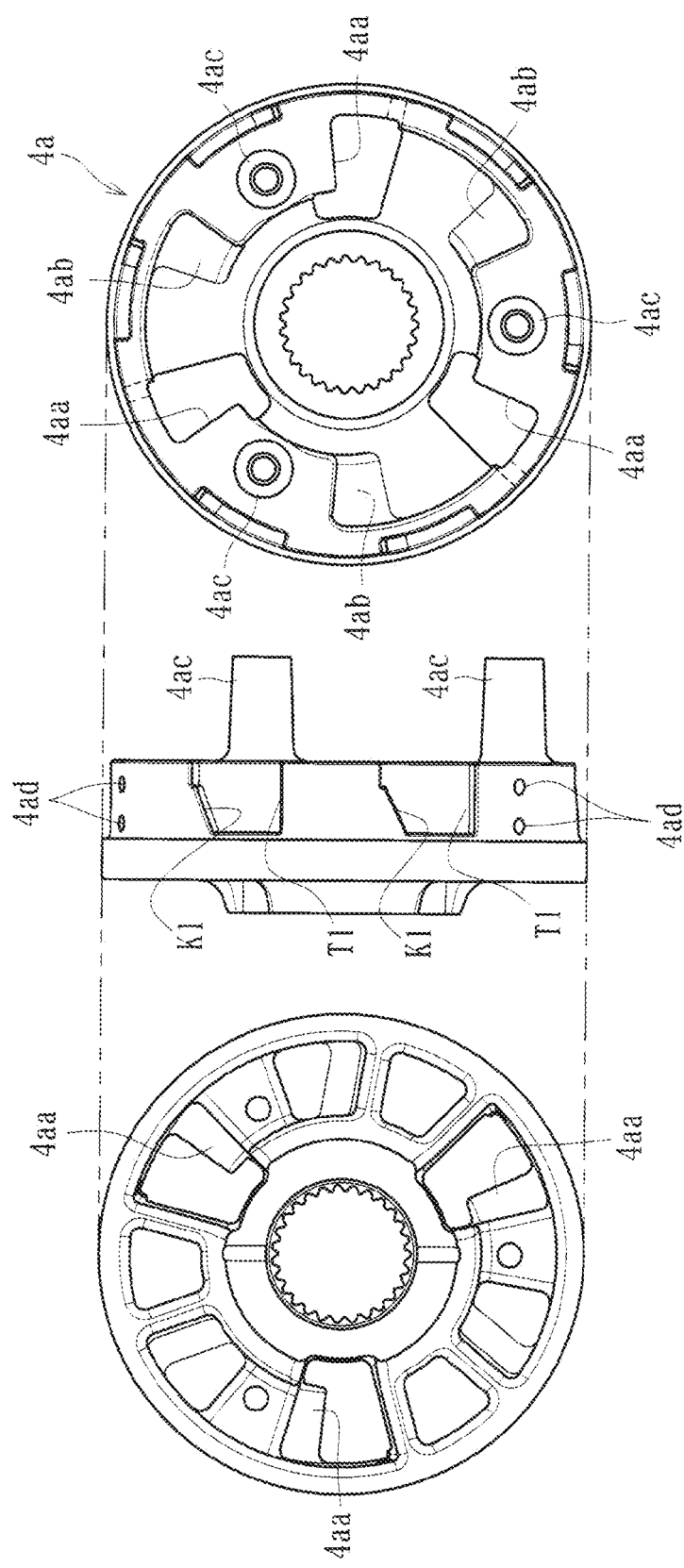
FIG. 5 is a three-view drawing of a first clutch of the power transmission apparatus.
Figure 6:
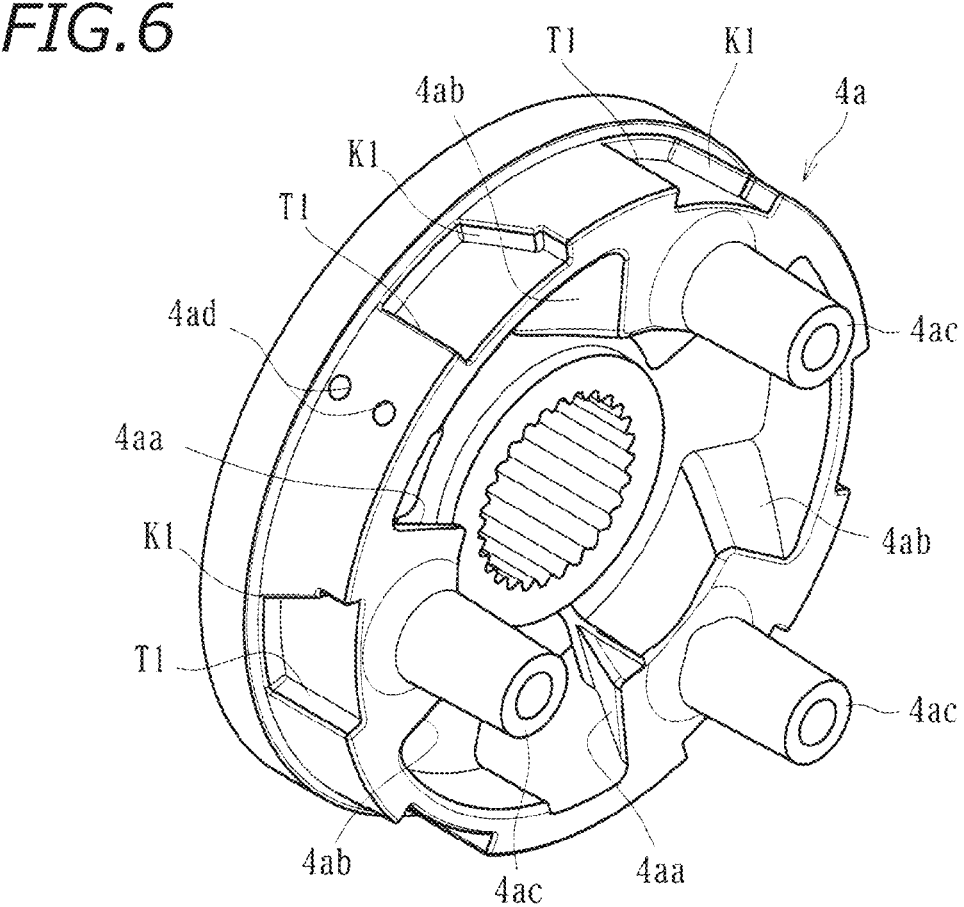
FIG. 6 is a perspective view of the first clutch.

The output shaft 3 is inserted through an insertion hole (see FIGS. 5 and 6) defined in the center of the first clutch 4a. A gear provided on the first clutch 4a and a gear provided on the output shaft 3 are in mesh with each other so as to be connected to each other in the direction of rotation. As illustrated in FIGS. 5 and 6, the first clutch 4a includes inclined surfaces 4aa defining a pressing assist cam, and inclined surfaces 4ab defining a back torque limiter cam. The reference signs "4ac" in FIGS. 5 and 6 each indicate a boss provided with an insertion hole for a bolt B for connection between the first clutch 4a and a securing structure 8.

Figure 1:
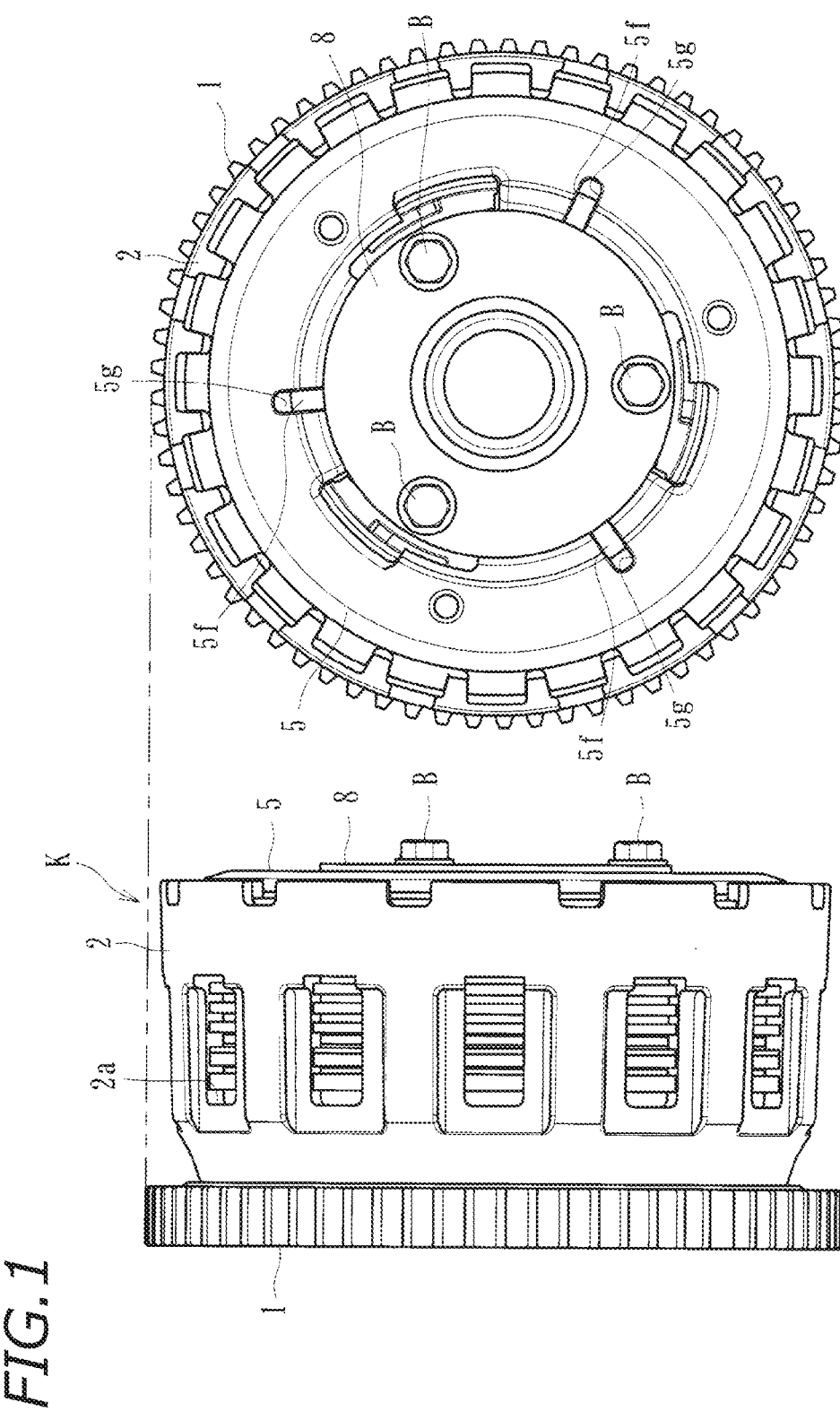
FIG. 1 is an external view of a power transmission apparatus according to a preferred embodiment of the present invention.
Figure 2:
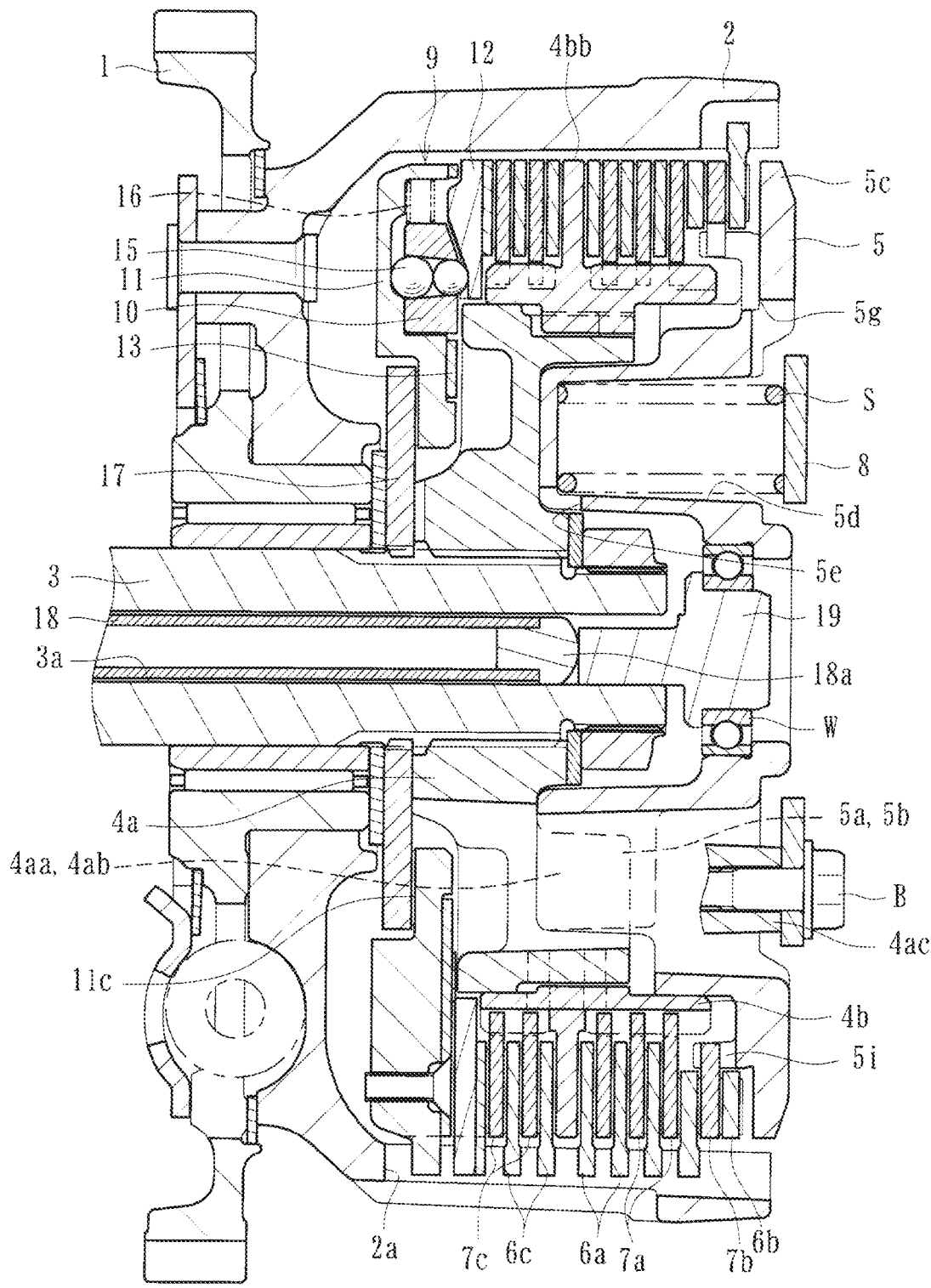
FIG. 2 is a vertical cross-sectional view of an internal structure of the power transmission apparatus.

As illustrated in FIG. 2, the output shaft 3 inserted through the first clutch 4a is provided with an insertion hole 3a extending in the axial direction. Oil is supplied into the clutch housing 2 through the insertion hole 3a. An operator 18, which is a rod, is inserted into the insertion hole 3a. An operating portion 18a is attached to an end of the operator 18. The operating portion 18a is assembled to the operator 18 such that the operating portion 18a is in abutment with a link 19. The link 19 is connected to a bearing W supporting the clutch pressure plate 5 such that the clutch pressure plate 5 is rotatable. Operating a clutch actuator (not illustrated) moves the operator 18 rightward in FIG. 2, so that the operating portion 18a pushes the link 19. Accordingly, the clutch pressure plate 5 is pushed rightward and is thus movable from an operating position to a non-operating position.

Figure 3:
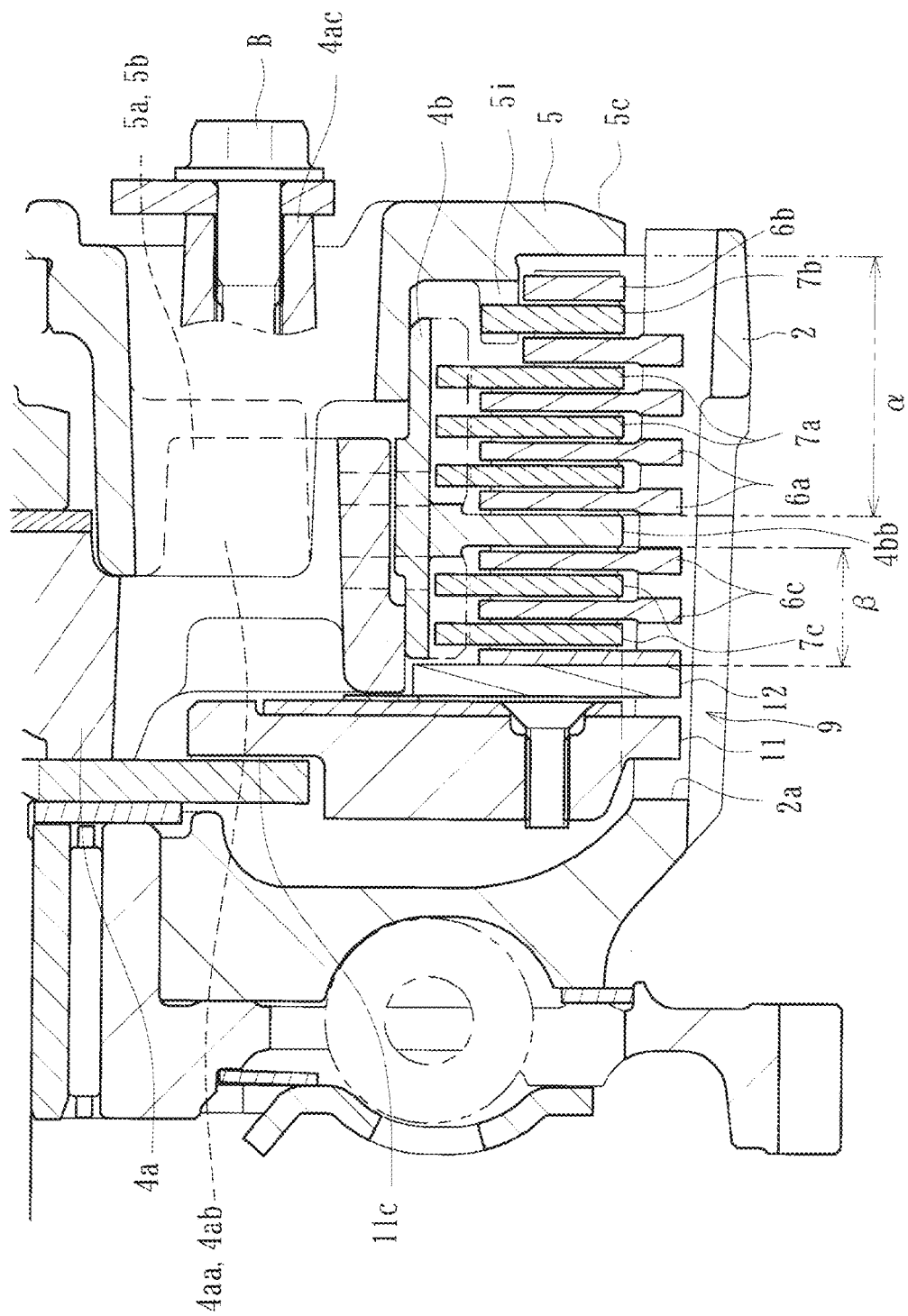
FIG. 3 is a partially enlarged view of the power transmission apparatus illustrated in FIG. 2.

As illustrated in FIGS. 7 to 10, the second clutch 4b is an annular structure including a divider 4bb. The driven clutch plates 7a and 7c are spline-fitted to spline-fitting portions 4ba provided on the outer peripheral surface of the second clutch 4b and are thus attached to the second clutch 4b. As illustrated in FIGS. 2 and 3, the clutch pressure plate 5 is assembled to the clutch (which includes the first clutch 4a and the second clutch 4b) such that the driving clutch plates (6a, 6b) and the driven clutch plates (7a, 7b) are alternately stacked and secured between a flange 5c of the clutch pressure plate 5 and the divider 4bb of the second clutch 4b.

As illustrated in FIGS. 11 to 14, the clutch pressure plate 5 includes a disk including the flange 5c extending along the peripheral edge of the clutch pressure plate 5. The clutch pressure plate 5 is movable between the operating position where the driving clutch plates (6a to 6c) and the driven clutch plates (7a to 7c) are pressed against each other so as to enable transmission of the driving force of the engine E to the wheel, and the non-operating position where a pressing force exerted on the driving clutch plates (6a to 6c) and the driven clutch plates (7a to 7c) is released so as to cut off transmission of the driving force of the engine E to the wheel.

Figure 7:
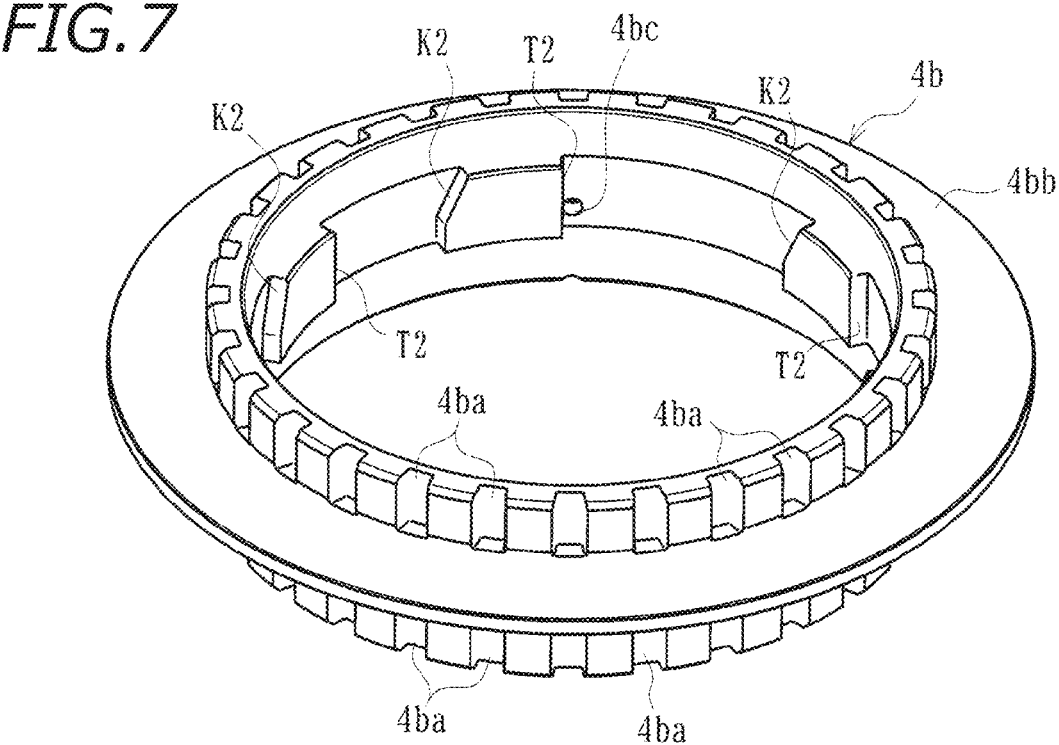
FIG. 7 is a front perspective view of a second clutch of the power transmission apparatus.
Figure 8:
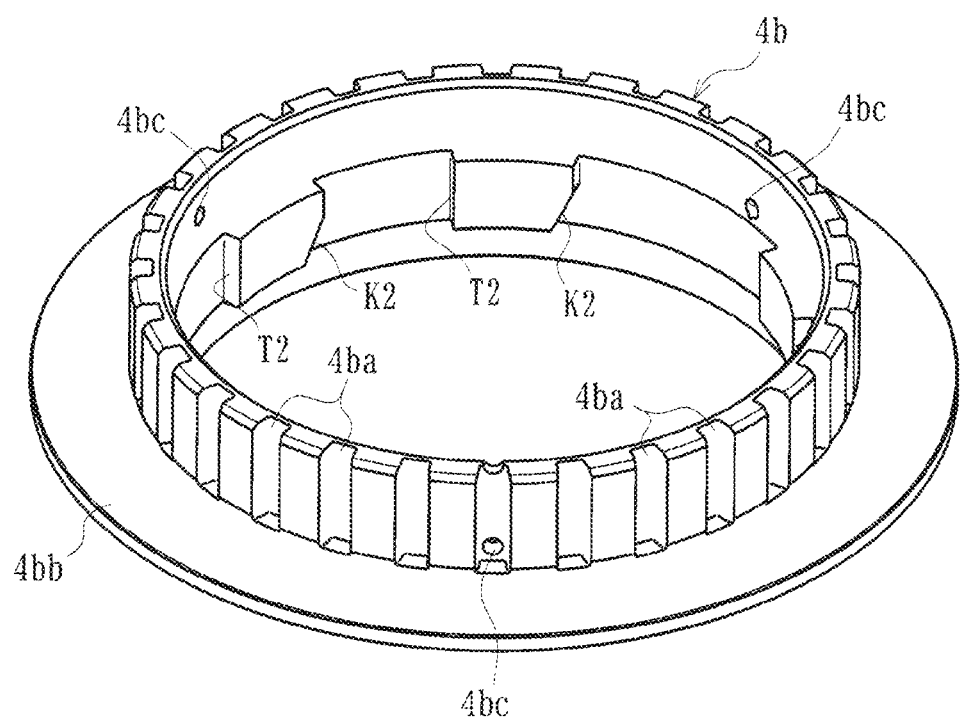
FIG. 8 is a rear perspective view of the second clutch of the power transmission apparatus.
Figure 9:
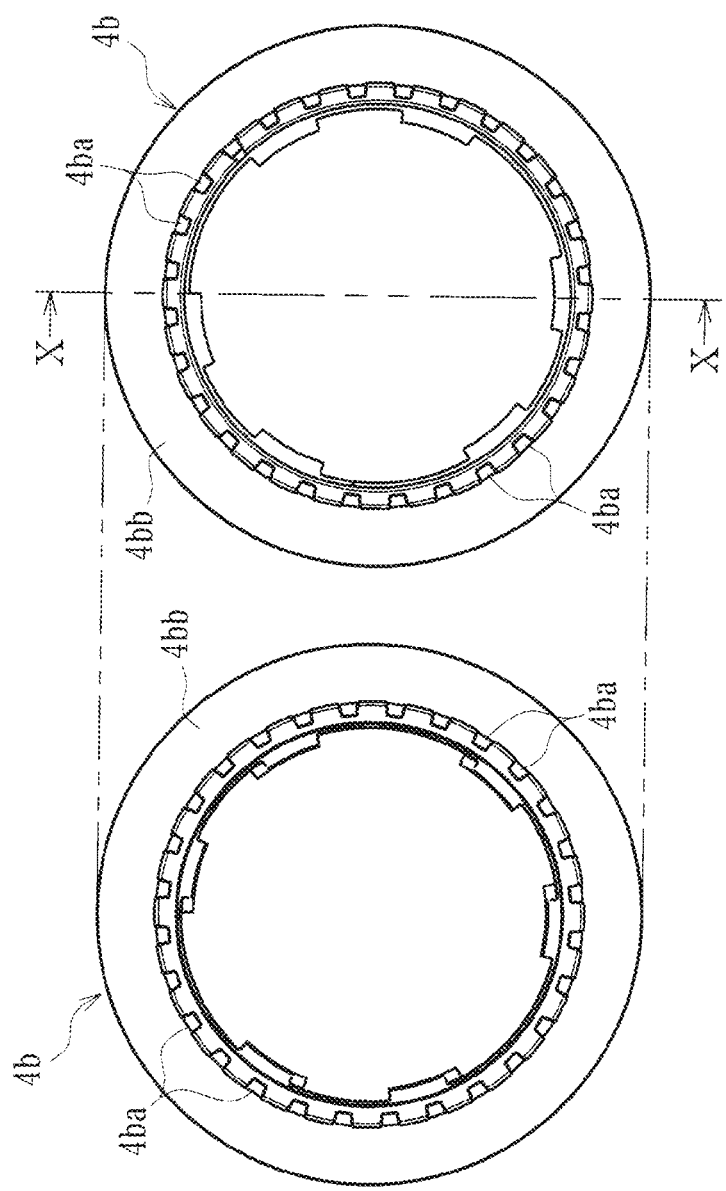
FIG. 9 provides a plan view and a rear view of the second clutch of the power transmission apparatus.
Figure 10:
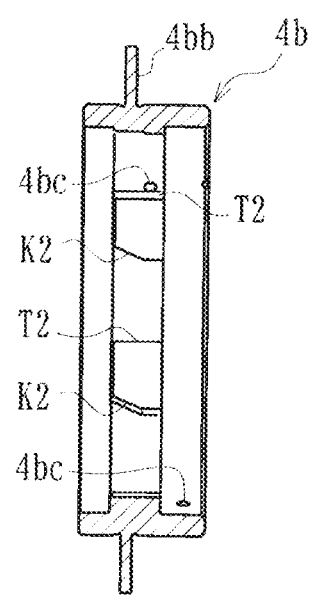
FIG. 10 is a cross-sectional view of the second clutch taken along the line X-X in FIG. 9.

More specifically, as illustrated in FIGS. 7 and 8, the spline-fitting portions 4ba provided on the second clutch 4b define integral projections and depressions along substantially the entire outer peripheral side surface of the second clutch 4b while being partitioned with the divider 4bb. Fitting the driven clutch plates 7a to recessed grooves that define the spline-fitting portions 4ba restricts movement of the driven clutch plates 7a in the direction of rotation while allowing movement of the driven clutch plates 7a in the axial direction relative to the second clutch 4b. The driven clutch plates 7a are rotatable together with the second clutch 4b.

As illustrated in FIGS. 5 to 8, the first clutch 4a and the second clutch 4b according to the present preferred embodiment are respectively provided with a plurality of oil supply holes (4ad) and a plurality of oil supply holes (4bc) through which oil is allowed to flow to the driven clutch plates 7a and 7c attached to the second clutch 4b. Oil flowing through the insertion hole 3a is supplied to the driven clutch plates 7a and 7c through a region adjacent to an end of the output shaft 3, the oil supply holes 4ad defined in the first clutch 4a, and the oil supply holes 4bc defined in the second clutch 4b.

The clutch pressure plate 5 according to the present preferred embodiment is provided with oil flow passages through which oil is allowed to flow to the driven clutch plate 7b attached to the clutch pressure plate 5. As illustrated in FIGS. 11 to 14, the oil flow passages each include an oil inlet 5e, a groove 5f, and an oil outlet 5g. The oil flow passages allow oil to flow toward the flange 5c of the clutch pressure plate 5 through housing recesses 5d in which clutch springs S are housed.

Figure 12:
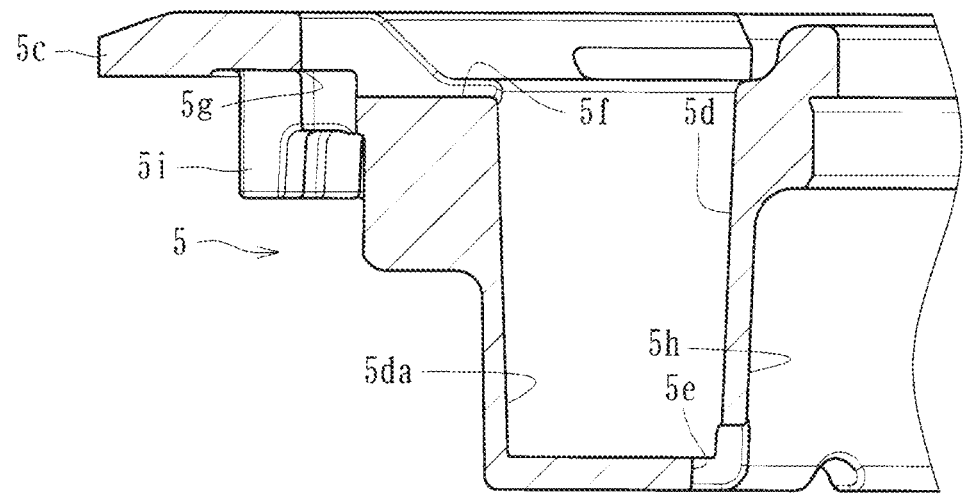
FIG. 12 is a cross-sectional view of the clutch pressure plate taken along the line XII-XII in FIG. 11.
Figure 13:
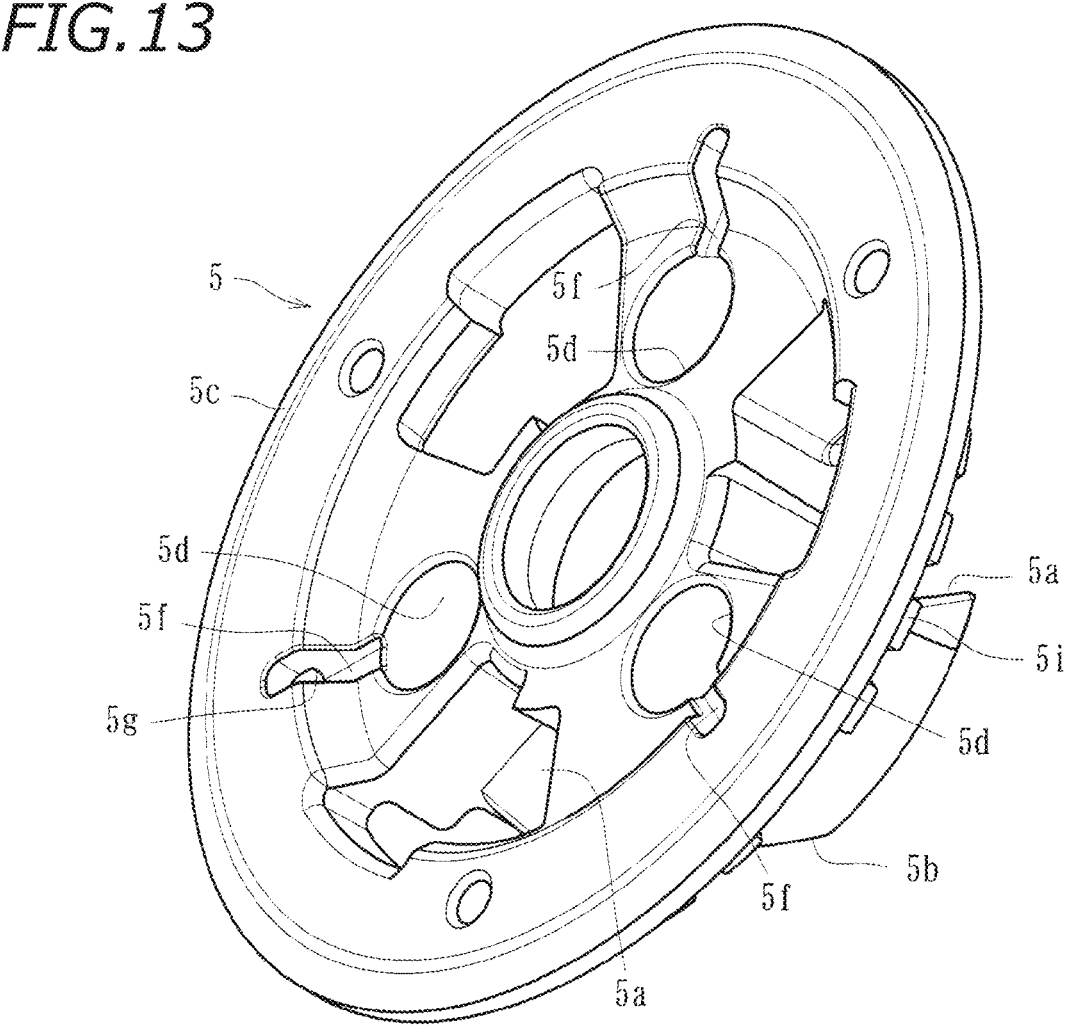
FIG. 13 is a front perspective view of the clutch pressure plate.
Figure 14:
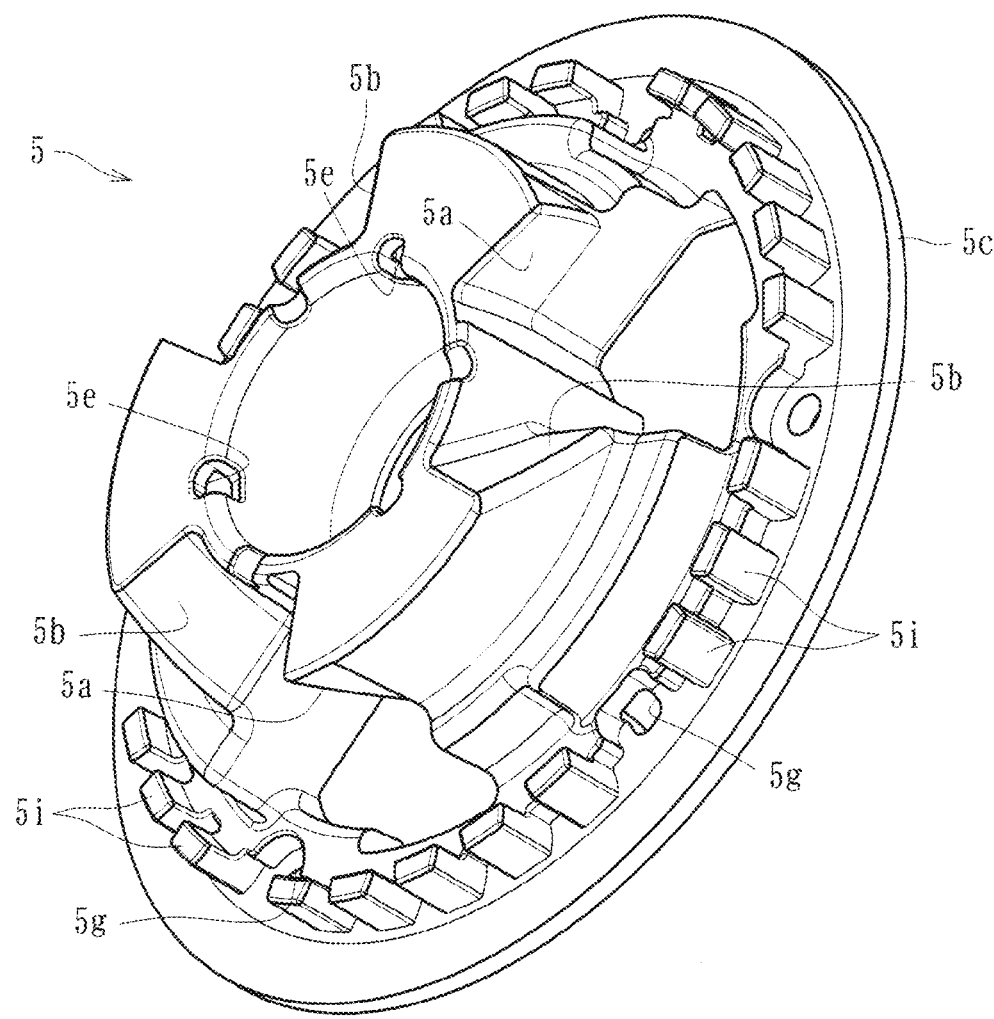
FIG. 14 is a rear perspective view of the clutch pressure plate.

As illustrated in FIGS. 12 and 14, each oil inlet 5e includes a first hole defined adjacent to the bottom of the associated housing recess 5d (i.e., defined adjacent to a portion of the associated housing recess 5d that receives an end of the associated clutch spring S). Each oil inlet 5e is in communication with the associated housing recess 5d and opens toward the center of the clutch pressure plate 5. As illustrated in FIGS. 12 and 13, each oil outlet 5g includes a second hole defined adjacent to the flange 5c of the clutch pressure plate 5. Each oil outlet 5g opens toward the radially outer end of the clutch pressure plate 5.

Each groove 5f has a groove geometry defined in the surface of the clutch pressure plate 5. Each groove 5f brings the opening edge of the associated housing recess 5d into communication with the associated oil outlet 5g (i.e., the associated second hole) and thus allows oil to flow from the opening edge of the associated housing recess 5d to the associated oil outlet 5g (i.e., the associated second hole). With centrifugal force, oil supplied from the insertion hole 3a flows along a surface 5h of the clutch pressure plate 5 (which is radially inward of the housing recesses 5d), reaches the oil inlets 5e (i.e., the first holes), and then flows into the housing recesses 5d through the oil inlets 5e.

The peripheral edge of the clutch pressure plate 5 is circumferentially provided with a plurality of protrusive fitting portions 5i. The driven clutch plate 7b is fitted to the fitting portions 5i and thus attached to the clutch pressure plate 5. The driven clutch plate 7b is attached to the clutch pressure plate 5, with the driving clutch plate 6b, the driven clutch plate 7b, and an adjacent one of the driving clutch plates 6a being stacked such that a first surface of the driven clutch plate 7b is in contact with the driving clutch plate 6b and a second surface of the driven clutch plate 7b is in contact with the adjacent one of the driving clutch plates 6*a*. The driven clutch plate 7*b* is allowed to move in the axial direction relative to the clutch pressure plate 5, prevented from moving in the direction of rotation, and rotatable together with the clutch pressure plate 5.

The driven clutch plates (7*a* to 7*c*) are stacked alternately with the driving clutch plates (6*a* to 6*c*), making it possible to press adjacent ones of the clutch plates (6*a* to 6*c*, 7*a* to 7*c*) against each other or release a pressing force exerted on adjacent ones of the clutch plates (6*a* to 6*c*, 7*a* to 7*c*). The clutch plates (6*a* to 6*c*, 7*a* to 7*c*) are allowed to slide in the axial direction of the second clutch 4*b* and the clutch pressure plate 5. Engaging a clutch by pressing the clutch plates (6*a*, 6*b*, 7*a*, 7*b*) against each other enables a rotational force of the clutch housing 2 to be transmitted to the output shaft 3 through the second clutch 4*b* and the first clutch 4*a*. Disengaging the clutch by releasing the pressing force exerted on the clutch plates (6*a*, 6*b*, 7*a*, 7*b*) causes the first clutch 4*a* and the second clutch 4*b* to stop following the rotation of the clutch housing 2 such that no rotational force will be transmitted to the output shaft 3.

Accordingly, a state where the driving clutch plates (6*a* to 6*c*) and the driven clutch plates (7*a* to 7*c*) are pressed against each other enables transmission of a rotational force (i.e., the driving force of the engine E), which is received by the clutch housing 2, to the driving wheel (or the transmission M) through the output shaft 3 (i.e., the output), and a state where the driving clutch plates (6*a* to 6*c*) and the driven clutch plates (7*a* to 7*c*) are not pressed against each other makes it possible to cut off transmission of the rotational force (i.e., the driving force of the engine E), which is received by the clutch housing 2, to the output shaft 3 (i.e., the output).

Figure 11:
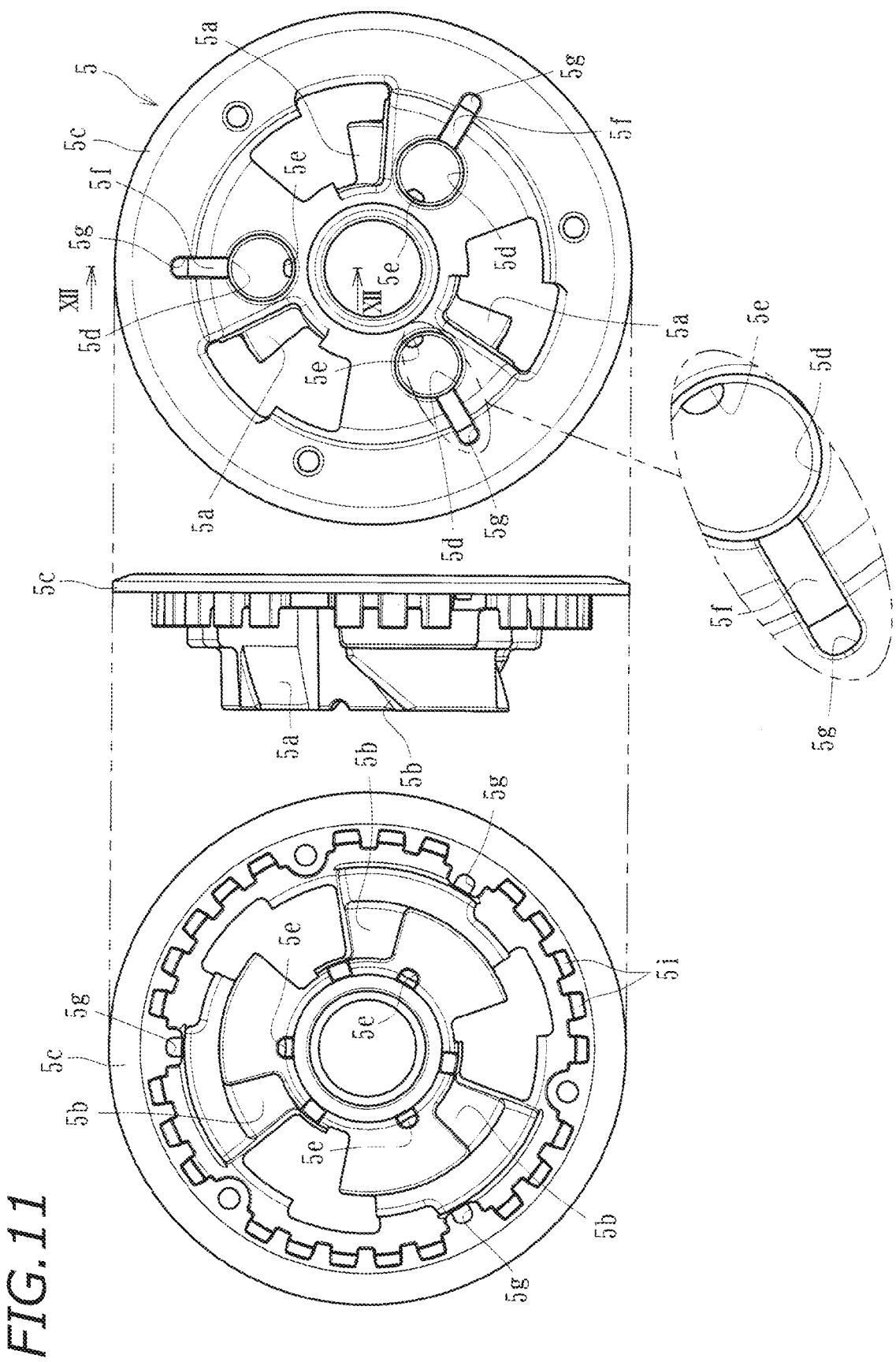
FIG. 11 is a three-view drawing of a clutch pressure plate of the power transmission apparatus.

As illustrated in FIGS. 11 and 13, the clutch pressure plate 5 is circumferentially provided with the housing recesses 5*d* (for example, three in the present preferred embodiment). The clutch springs S are each fitted into an associated one of the housing recesses 5*d*. As illustrated in FIG. 2, one end of each clutch spring S housed in the associated housing recess 5*d* is in abutment with the securing structure 8, such that each clutch spring S urges the clutch pressure plate 5 in a direction in which the driving clutch plates (6*a* to 6*c*) and the driven clutch plates (7*a* to 7*c*) are to be pressed against each other.

Operating the clutch actuator (not illustrated) moves the operator 18, which pushes the link 19 rightward in FIG. 2. The clutch pressure plate 5 is thus pushed rightward and moved to the non-operating position, making it possible to press the driving clutch plates (6*a* to 6*c*) and the driven clutch plates (7*a* to 7*c*) against each other or stop pressing the driving clutch plates (6*a* to 6*c*) and the driven clutch plates (7*a* to 7*c*) against each other.

In the present preferred embodiment, as illustrated in FIGS. 5, 6, 11, and 14, the first clutch 4*a* is provided with the inclined surfaces 4*aa* and 4*ab*, and the clutch pressure plate 5 is provided with inclined surfaces 5*a* and 5*b* respectively facing the inclined surfaces 4*aa* and 4*ab*. Specifically, each inclined surface 4*aa* comes into abutment with the associated inclined surface 5*a* so as to provide the pressing assist cam, and each inclined surface 4*ab* comes into abutment with the associated inclined surface 5*b* so as to provide the back torque limiter cam.

Figure 17A:
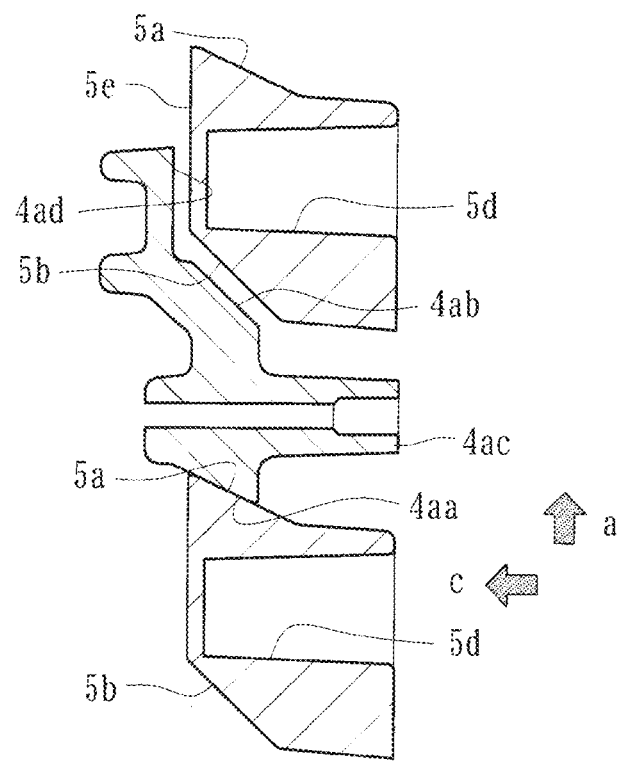
FIG. 17A is a schematic diagram illustrating how a pressing assist cam of the power transmission apparatus acts.

Suppose that the rotation speed of the engine E is increased and the resulting rotational force received by the input gear 1 and the clutch housing 2 is transmittable to the output shaft 3 through the first clutch 4*a* and the second clutch 4*b* (which means that the weights 10 are each located at a radially outer position). In this case, as illustrated in FIG. 17A, the rotational force is applied to the clutch pressure plate 5 in an a-direction, which exerts a force on the clutch pressure plate 5 in a c-direction in FIG. 17A under the action of the pressing assist cam. The clutch pressure plate 5 is thus moved in a direction in which its flange 5*c* comes closer to the flange 4*bb* of the second clutch 4*b* (i.e., leftward in FIG. 2) so as to increase the pressing force exerted on the driving clutch plates (6*a* to 6*c*) and the driven clutch plates (7*a* to 7*c*).

Figure 17B:
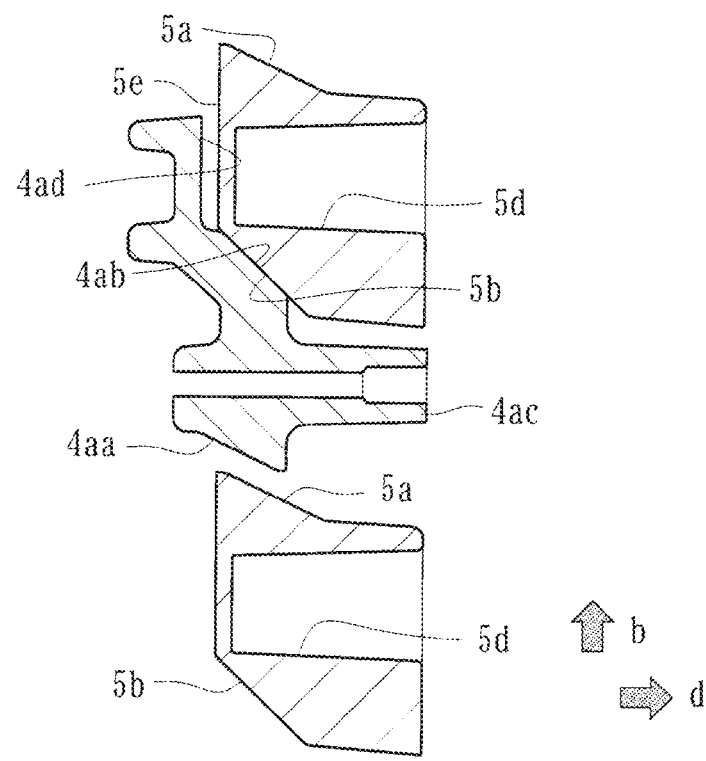
FIG. 17B is a schematic diagram illustrating how a back torque limiter cam of the power transmission apparatus acts.

Suppose that the rotation of the output shaft 3 exceeds the rotation speed of the input gear 1 and the clutch housing 2, resulting in a back torque. In this case, as illustrated in FIG. 17B, a rotational force is applied to the clutch 4 in a b-direction, which moves the clutch pressure plate 5 in a d-direction in FIG. 17B under the action of the back torque limiter cam so as to release the pressing force exerted on the driving clutch plates (6*a* to 6*c*) and the driven clutch plates (7*a* to 7*c*). This makes it possible to prevent a malfunction in the power transmission apparatus K or a power source (i.e., the engine E) caused by the back torque.

Figure 15:
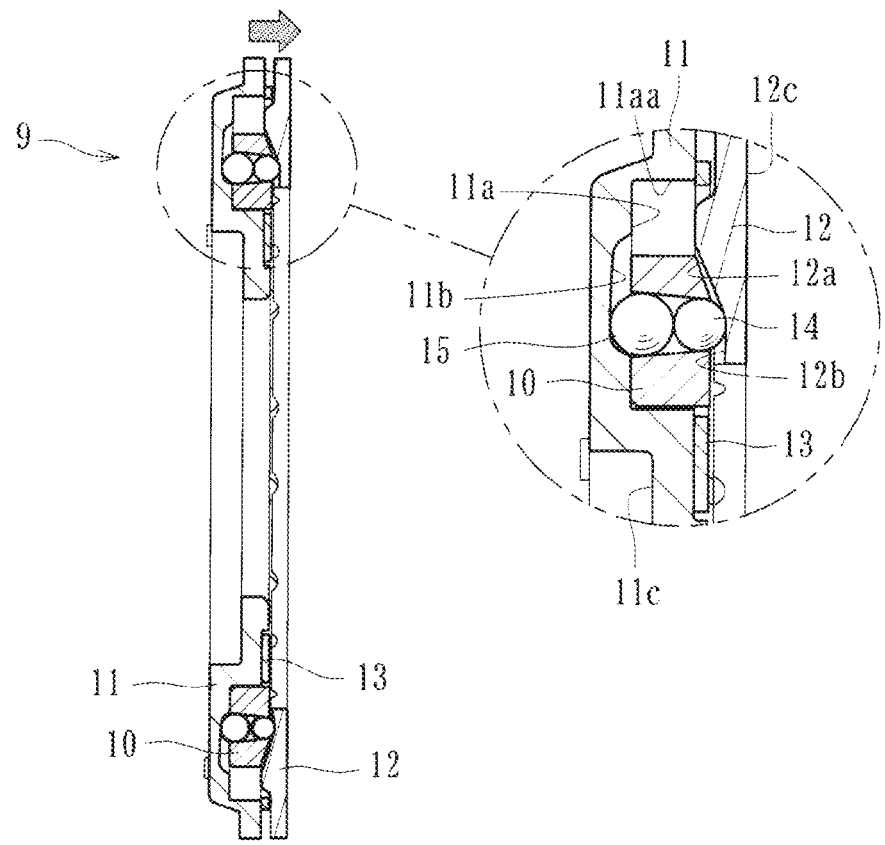
FIG. 15 is a vertical cross-sectional view of a centrifugal clutch of the power transmission apparatus.
Figure 16:
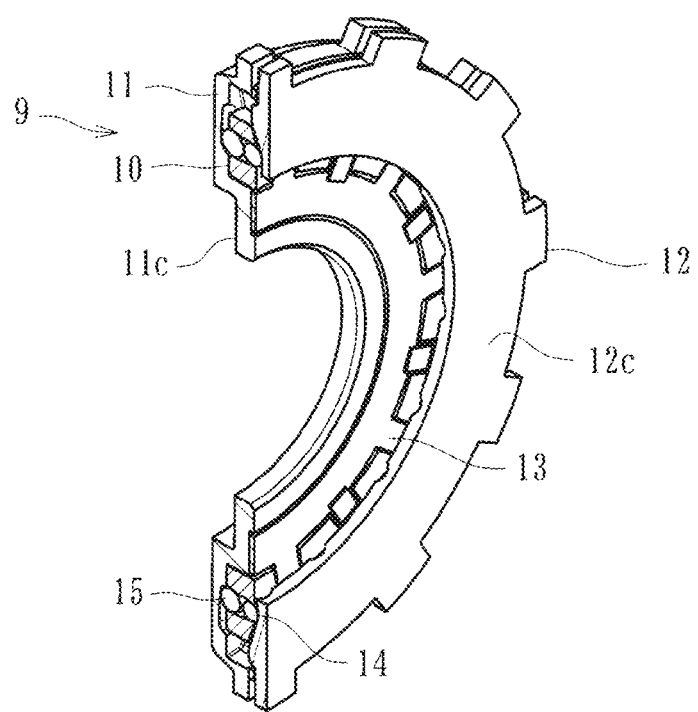
FIG. 16 is a partially cutaway perspective view of the centrifugal clutch.
Figure 19:
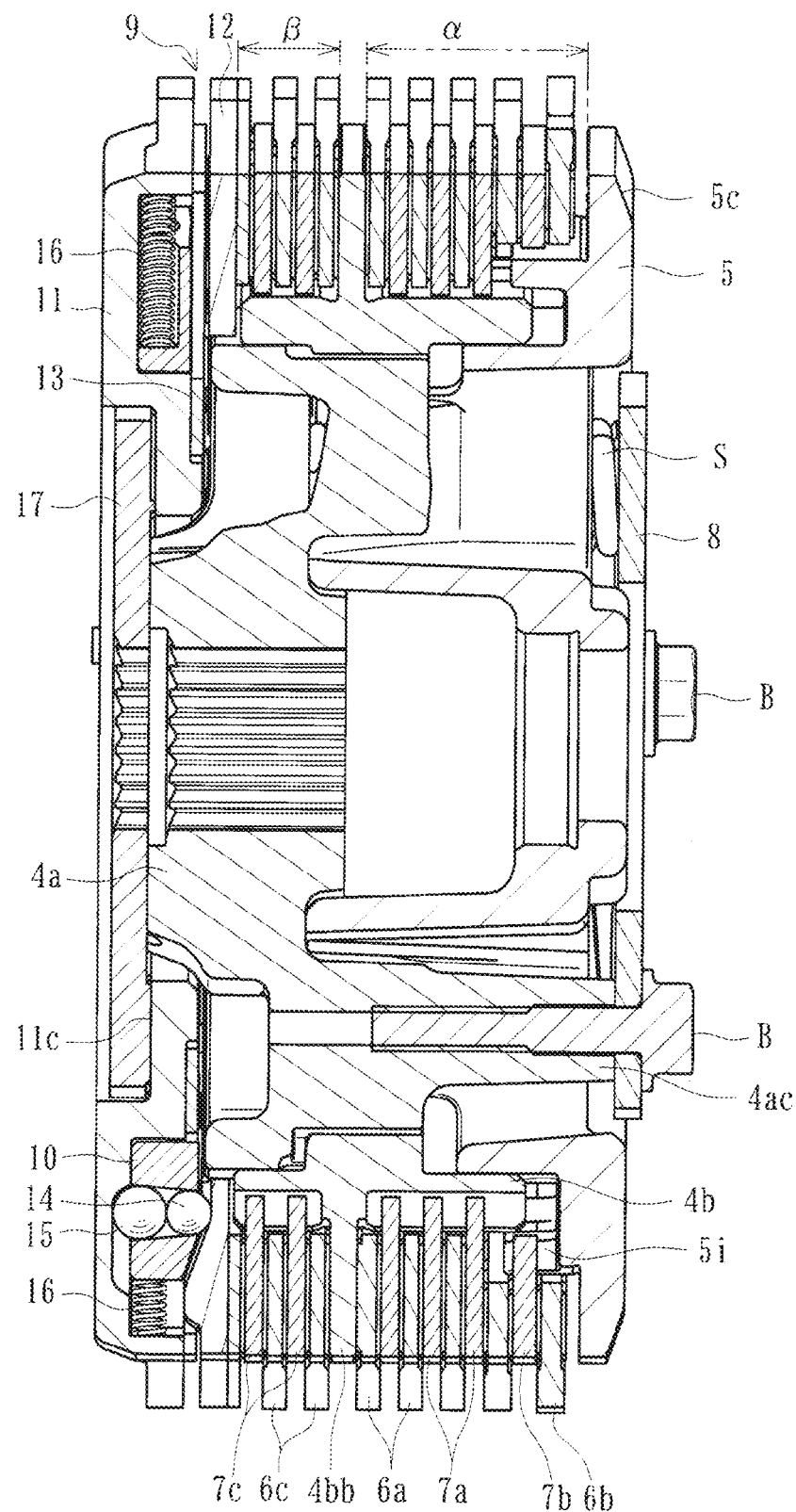
FIG. 19 is a cross-sectional view illustrating a state of the power transmission apparatus where each weight is located at a radially inner position.
Figure 21:
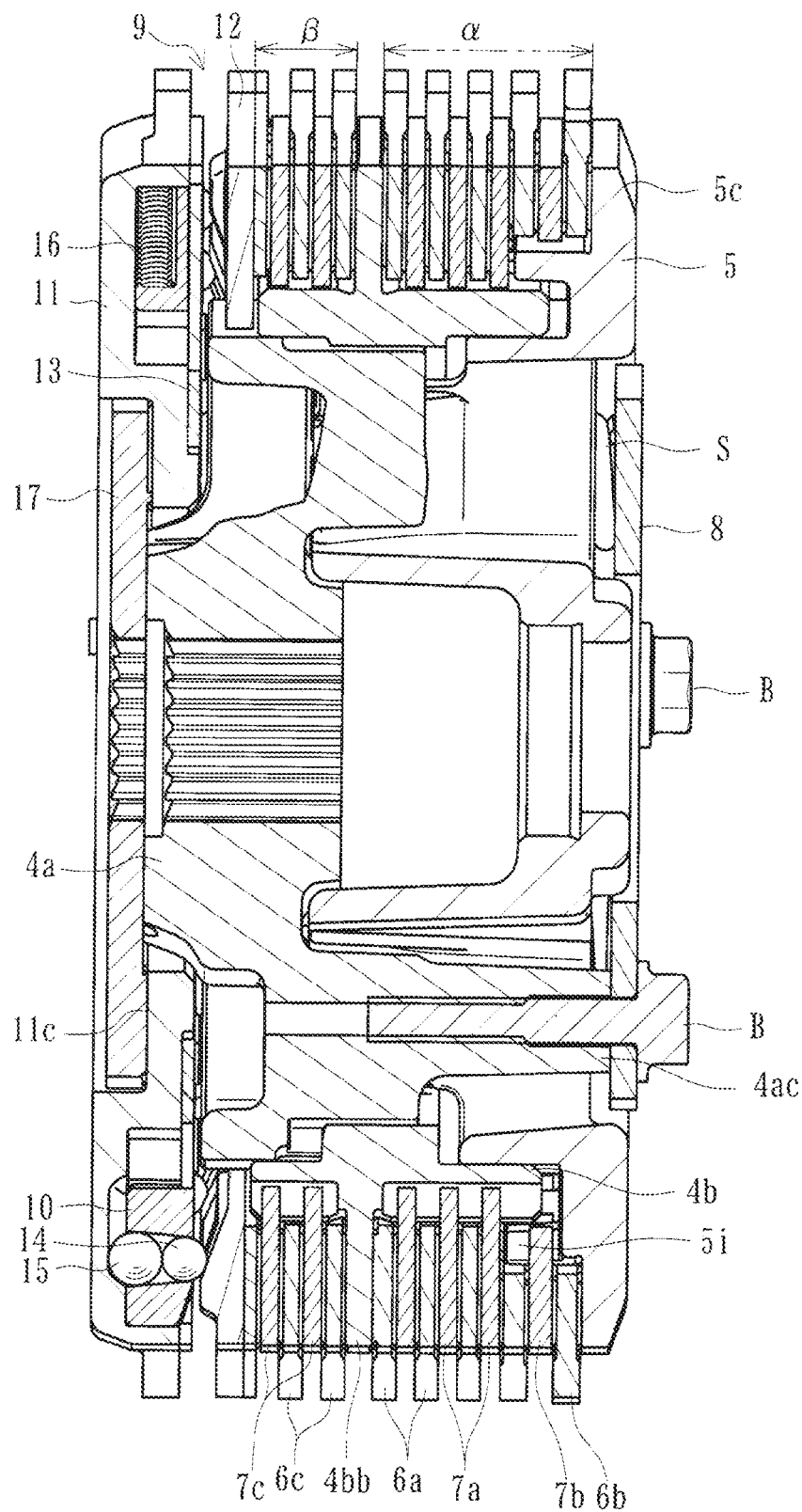
FIG. 21 is a cross-sectional view illustrating a state of the power transmission apparatus where each weight is located at the radially outer position.

As illustrated in FIGS. 15 and 16, the centrifugal clutch 9 includes the weights 10 each movable from a radially inner position (see FIG. 19) to the radially outer position (see FIG. 21) with centrifugal force produced by rotation of the clutch housing 2. When the weights 10 are each located at the radially outer position, the centrifugal clutch 9 presses the driving clutch plates (6*a* to 6*c*) and the driven clutch plates (7*a* to 7*c*) against each other so as to enable transmission of the driving force of the engine E to the wheel (i.e., the driving wheel T). When the weights 10 are each located at the radially inner position, the centrifugal clutch 9 releases the pressing force exerted on the driving clutch plates (6*a* to 6*c*) and the driven clutch plates (7*a* to 7*c*) so as to cut off transmission of the driving force of the engine E to the wheel (i.e., the driving wheel T).

Specifically, the centrifugal clutch 9 includes the weights 10, each of which is a substantially symmetrical polygonal body, a holder 11 including a support 13 attached thereto, a press 12, first spherical bodies 14, second spherical bodies 15, and springs 16, each of which is a coil spring. The holder 11 and the press 12 are each circumferentially provided with a plurality of protrusions. Similarly to the driving clutch plates 6, the protrusions are fitted to the cut-outs 2*a* of the clutch housing 2 such that the holder 11 and the press 12 are attached to the clutch housing 2. Accordingly, the holder 11 and the press 12 are each movable in the axial direction of the clutch housing 2 and in engagement with the clutch housing 2 in the direction of rotation so as to be rotatable together with the clutch housing 2.

As illustrated in FIG. 15, the weights 10 are each housed in an associated one of housing portions 11*a* of the holder 11. When no centrifugal force is applied to the weights 10, the weights 10 are each held at the radially inner position. Application of centrifugal force to the weights 10 moves the weights 10 outward against the urging force of the springs 16 such that each weight 10 reaches the radially outer position. The holder 11 holds the weights 10 such that each weight 10 is movable between the radially inner position and the radially outer position. As illustrated in FIG. 16, the holder 11 is an annular structure. The holder 11 includes the housing portions 11*a* which are arranged in the circumferential direction of the holder 11 and in which the weights 10 are housed, grooves 11*b* defined in the housing portions 11*a*, and a pushing surface 11*c*.

Each housing portion 11*a* has a recessed shape conforming to the shape and moving range of the associated weight 10. An outer peripheral wall surface 11*aa* of each housing portion 11*a* is allowed to abut against one end of the associated spring 16 (see FIG. 2). The support 13 is secured to a surface of the holder 11, which is provided with the housing portions 11*a*. The weights 10 are thus held between the holder 11 and the press 12, with the support 13 interposed therebetween, such that the weights 10 are movable radially.

Movement of each weight 10 from the radially inner position to the radially outer position causes the press 12 to move in a direction in which the driving clutch plates (6*a* to 6*c*) and the driven clutch plates (7*a* to 7*c*) are stacked, i.e., rightward in FIG. 2, such that the driving clutch plates (6*a* to 6*c*) and the driven clutch plates (7*a* to 7*c*) are pressed against each other. Specifically, as illustrated in FIG. 16, the press 12 is an annular structure. The press 12 includes inclined grooves 12*a* arranged in the circumferential direction of the press 12, grooves 12*b* each defined adjacent to the associated inclined groove 12*a*, and a pushing surface 12*c*.

Each inclined groove 12*a* is defined in a portion of the press 12 facing the associated weight 10. Each inclined groove 12*a* is inclined upward from its inner portion to its outer portion. Thus, when the clutch housing 2 is stationary, each weight 10 is held at the radially inner position with the urging force of the associated spring 16 (see FIG. 19). Rotation of the clutch housing 2 applies centrifugal force to the weights 10 so as to move the weights 10 along the inclined grooves 12*a* inclined upward. This moves the press 12 in a direction away from the holder 11, i.e., in the direction in which the driving clutch plates (6*a* to 6*c*) and the driven clutch plates (7*a* to 7*c*) are to be pressed against each other (see FIGS. 20 and 21).

When the holder 11 and the press 12 are assembled to each other, with the weights 10 interposed therebetween, each inclined groove 12*a* faces the associated weight 10 as illustrated in FIGS. 15 and 16. With centrifugal force, each weight 10 moves from the radially inner position to the radially outer position along the associated inclined groove 12*a*, which moves the press 12 in a direction indicated by the arrow in FIG. 15 (i.e., rightward in FIG. 15). The pushing surface 12*c* of the press 12 thus pushes the driving clutch plates (6*a* to 6*c*) and the driven clutch plates (7*a* to 7*c*) such that the driving clutch plates (6*a* to 6*c*) and the driven clutch plates (7*a* to 7*c*) are pressed against each other. The resulting reaction force moves the holder 11 in a direction opposite to the direction indicated by the arrow in FIG. 14 (i.e., leftward in FIG. 14), so that the pushing surface 11*c* of the holder 11 presses the auxiliary clutch plate 17.

Each first spherical body 14 is a steel ball attached to the associated weight 10. Each first spherical body 14 is partially protruded from a first opening of a through hole defined in the associated weight 10 and is in contact with a rolling contact surface of the press 12 so as to be rollable thereon. Each second spherical body 15 is a steel ball attached to the associated weight 10. Each second spherical body 15 is partially protruded from a second opening of the through hole defined in the associated weight 10 and is in contact with a rolling contact surface of the holder 11 so as to be rollable thereon.

Figure 20:
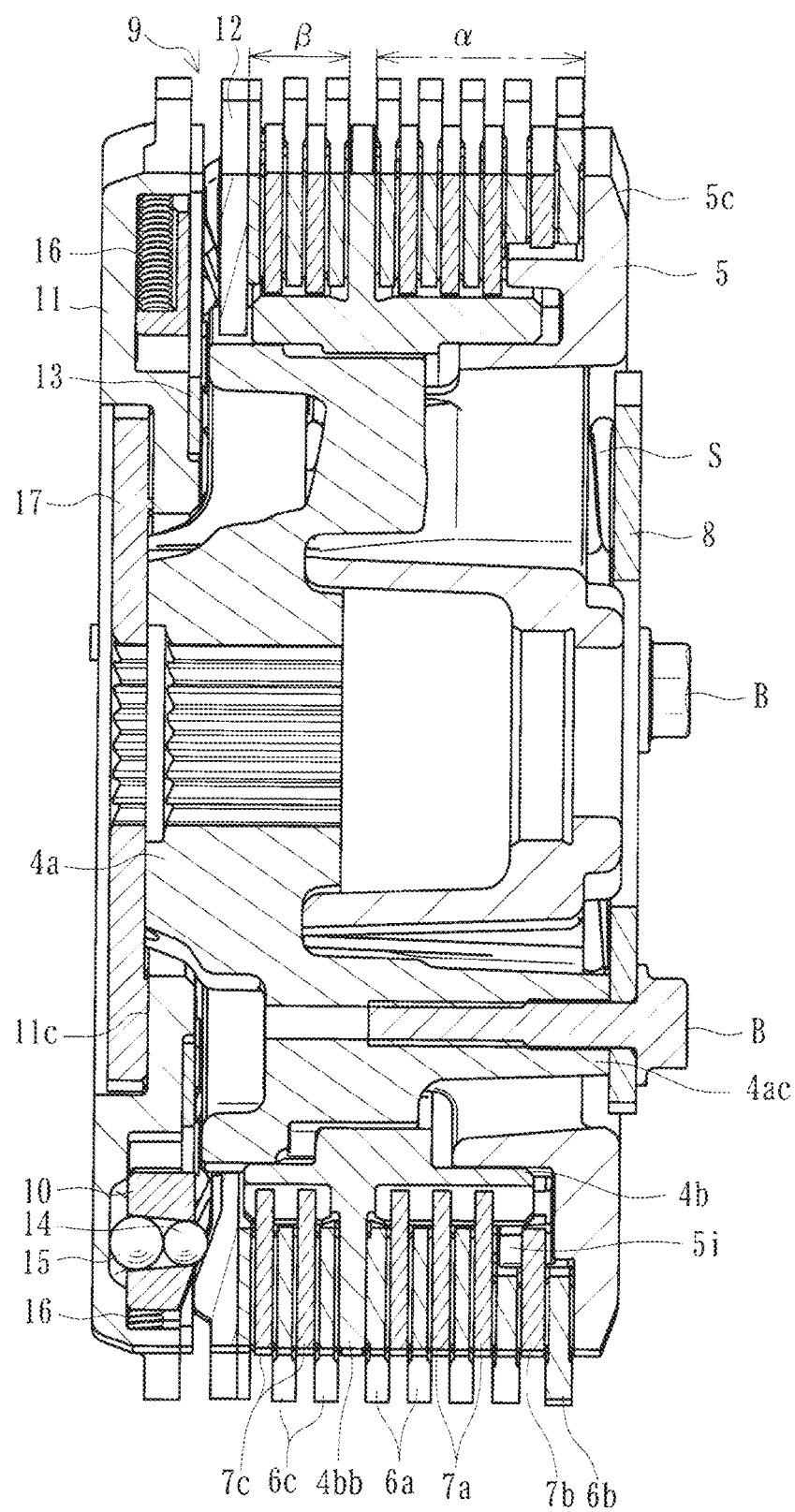
FIG. 20 is a cross-sectional view illustrating a state of the power transmission apparatus where each weight is located at an intermediate position between the radially inner position and a radially outer position.
Figure 22:
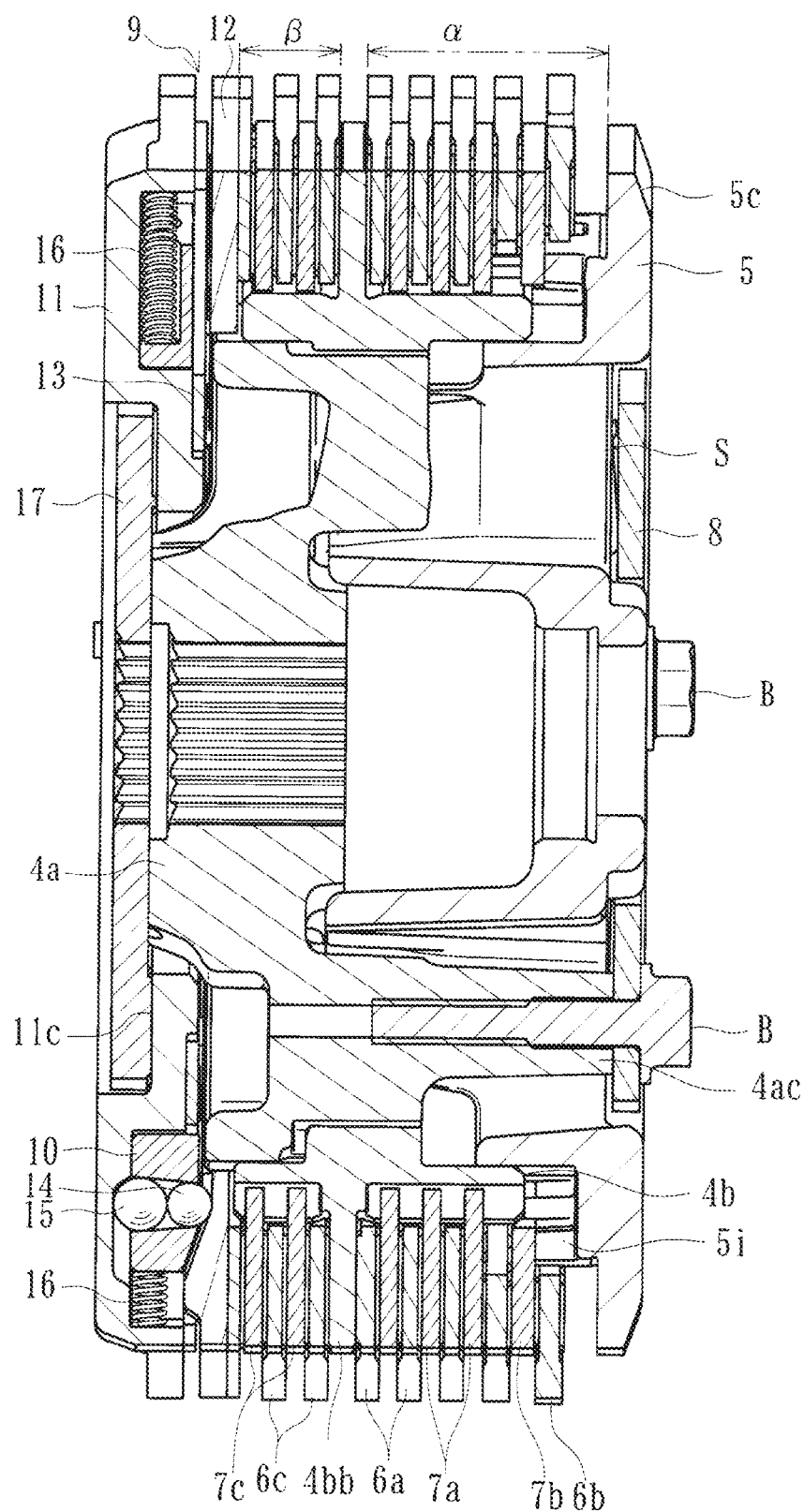
FIG. 22 is a cross-sectional view illustrating a state of the power transmission apparatus where each weight is located at the radially inner position and the clutch pressure plate is located at a non-operating position.
Figure 23:
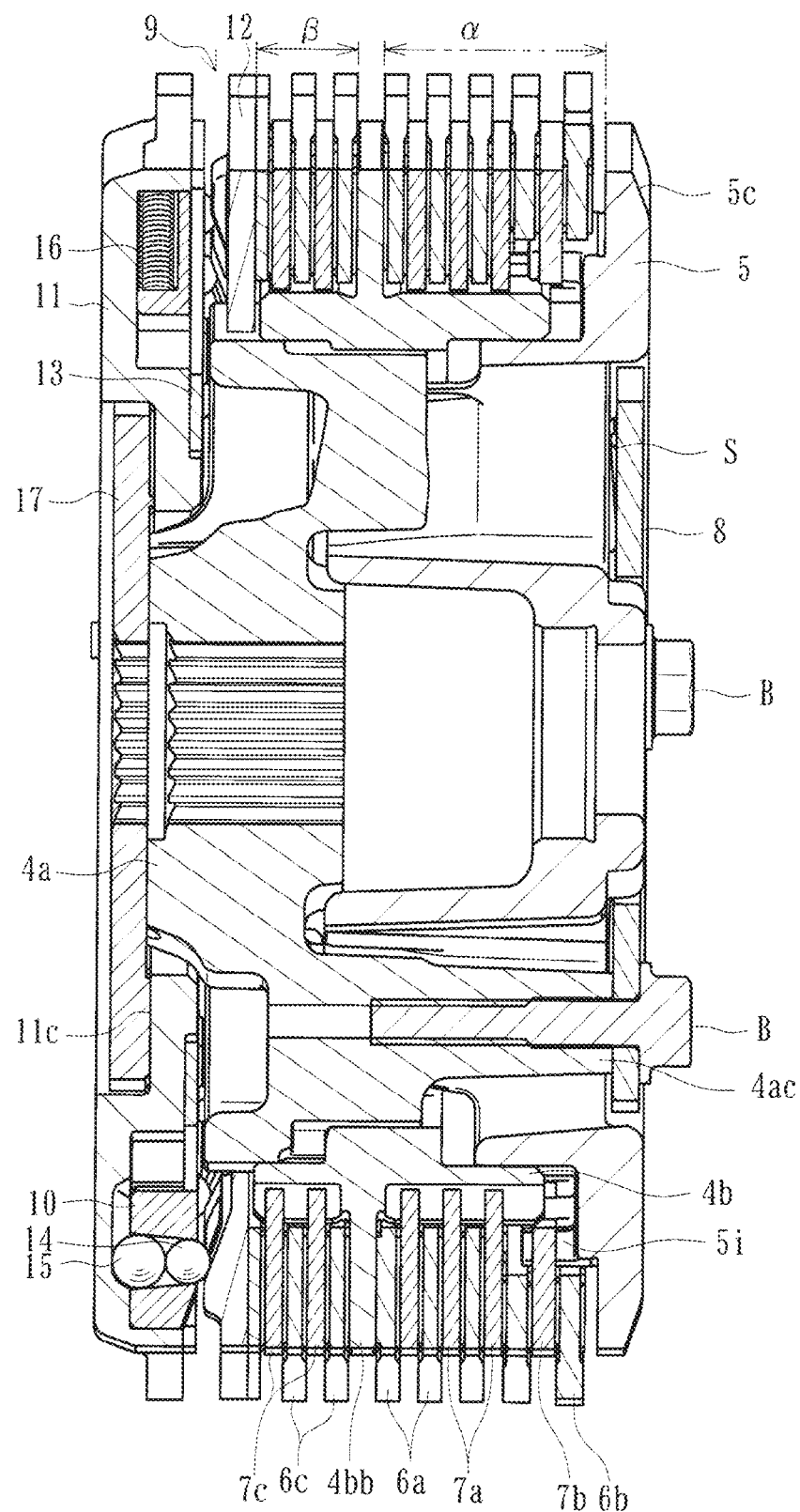
FIG. 23 is a cross-sectional view illustrating a state of the power transmission apparatus where each weight is located at the radially outer position and the clutch pressure plate is located at the non-operating position.

Specifically, when no centrifugal force is applied to the weights 10, the weights 10 are each held at the radially inner position (see FIG. 19) such that the pressing force exerted on the driving clutch plates (6*a* to 6*c*) and the driven clutch plates (7*a* to 7*c*) is released. Application of centrifugal force to the weights 10 causes each weight 10 to move outward as illustrated in FIG. 20 and then reach the radially outer position (see FIG. 21). This presses the driving clutch plates (6*a* to 6*c*) and the driven clutch plates (7*a* to 7*c*) against each other such that the driving force of the engine E is transmittable to the wheel T. FIG. 22 illustrates a state where each weight 10 is located at the radially inner position and the clutch pressure plate 5 is located at the non-operating position. FIG. 23 illustrates a state where each weight 10 is located at the radially outer position and the clutch pressure plate 5 is located at the non-operating position.

The auxiliary clutch plate 17 is disposed inside the clutch housing 2. The auxiliary clutch plate 17 is an annular structure different in diameter from the driving clutch plates (6*a* to 6*c*) and the driven clutch plates (7*a* to 7*c*). In the present preferred embodiment, the auxiliary clutch plate 17 is smaller in diameter than the driving clutch plates (6*a* to 6*c*) and the driven clutch plates (7*a* to 7*c*). As illustrated in FIG. 2, the output shaft 3 (i.e., the output) is inserted through a central opening of the auxiliary clutch plate 17 so as to be fitted thereto. The auxiliary clutch plate 17 includes a pushed surface facing the pushing surface 11*c* of the holder 11.

When the weights 10 are each located at the radially outer position, i.e., when the driving clutch plates (6*a* to 6*c*) and the driven clutch plates (7*a* to 7*c*) are pressed against each other, the auxiliary clutch plate 17 is able to transmit the driving force of the engine E to the output shaft 3 upon being pushed by the pushing surface 11*c* of the holder 11 and pressed against the pushing surface 11*c*. When the weights 10 are each located at the radially inner position, i.e., when the pressing force exerted on the driving clutch plates (6*a* to 6*c*) and the driven clutch plates (7*a* to 7*c*) is released, the auxiliary clutch plate 17 is able to cut off transmission of the driving force of the engine E to the output shaft 3 upon being relieved of a pressing force applied thereto, due to a decrease in pushing force exerted by the pushing surface 11*c* of the holder 11.

Upon movement of each weight 10 to the radially outer position, the inclined grooves 12*a* function as a cam so as to cause the holder 11 and the press 12 to move away from each other. Accordingly, the pushing surface 12*c* of the press 12 presses the driving clutch plates (6*a* to 6*c*) and the driven clutch plates (7*a* to 7*c*) against each other, and the pushing surface 11*c* of the holder 11 pushes the pushed surface of the auxiliary clutch plate 17 such that the pushed surface is pressed against the pushing surface 11*c*, resulting in transmission of the driving force of the engine E to the driving wheel T.

The back torque transmission cam is able to, when the clutch pressure plate 5 is located at the non-operating position, move the second clutch 4*b* so as to press the driving clutch plates (6*a* to 6*c*) and the driven clutch plates (7*a* to 7*c*) against each other upon reception of a rotational force by the first clutch 4*a* through the output shaft 3 (i.e., the output). The back torque transmission cam includes the cam surfaces K1 (see FIGS. 5 and 6) defined on the first clutch 4*a*, and the cam surfaces K2 (see FIGS. 7 and 10) defined on the second clutch 4*b*.

More specifically, combining the first clutch 4*a* with the second clutch 4*b* causes the cam surfaces K1 to face the cam surfaces K2. Upon reception of a rotational force by the first clutch 4*a* through the output shaft 3 (i.e., the output), the cam action of the cam surfaces (K1, K2) moves the second clutch 4*b* toward the clutch pressure plate 5 (i.e., rightward in FIG. 2). Accordingly, during operation of the back torque transmission cam, the second clutch 4*b* is movable toward the clutch pressure plate 5 upon receiving a pressing force produced by the back torque transmission cam, making it possible to press the driving clutch plates (6*a*, 6*b*) and the driven clutch plates (7*a*, 7*b*) against each other.

Combining the first clutch 4a with the second clutch 4b causes abutment surfaces T1 (see FIGS. 5 and 6) defined on the first clutch 4a to face abutment surfaces T2 (see FIGS. 7, 8, and 10) defined on the second clutch 4b. Rotation of the first clutch 4a brings the abutment surfaces T1 into abutment with the abutment surfaces T2 such that the second clutch 4b is rotatable in the same direction as the first clutch 4a.

As illustrated in FIGS. 7 to 10, the second clutch 4b according to the present preferred embodiment includes the divider 4bb dividing the driving clutch plates (6a to 6c) and the driven clutch plates (7a to 7c) in the axial direction (which corresponds to the right-left direction in FIG. 2) such that a first region α adjacent to the clutch pressure plate 5 and a second region β adjacent to the centrifugal clutch 9 are defined. The second clutch 4b presses the driving clutch plates (6a to 6c) and the driven clutch plates (7a to 7c) in the first region α and the second region β against each other during operation of the centrifugal clutch 9. The second clutch 4b presses the driving clutch plates (6a, 6b) and the driven clutch plates (7a, 7b) in the first region α against each other during operation of the back torque transmission cam (which includes the cam surfaces K1 and K2). In other words, the second clutch 4b does not press the driving clutch plates 6c and the driven clutch plates 7c in the second region β against each other during operation of the back torque transmission cam.

To be more specific, the divider 4bb according to the present preferred embodiment is a flange provided on the second clutch 4b. As illustrated in FIG. 3 and FIGS. 19 to 23, the divider 4bb divides an internal space of the clutch housing 2 into the first region α where the driving clutch plates (6a, 6b) and the driven clutch plates (7a, 7b) are disposed (which is, in the present preferred embodiment, a region located between the divider 4bb of the second clutch 4b and the flange 5c of the clutch pressure plate 5); and the second region β where the driving clutch plates 6c and the driven clutch plates 7c are disposed (which is, in the present preferred embodiment, a region located between the divider 4bb of the second clutch 4b and the centrifugal clutch 9).

Accordingly, when the centrifugal clutch 9 is in operation and the back torque transmission cam is not in operation, the centrifugal clutch 9 and the clutch pressure plate 5 produce a pressing force by which the driving clutch plates (6a to 6c) and the driven clutch plates (7a to 7c) in the first region α and the second region β are pressed against each other. When the back torque transmission cam is in operation and the centrifugal clutch 9 is not in operation, the divider 4bb and the clutch pressure plate 5 produce a pressing force by which the driving clutch plates (6a, 6b) and the driven clutch plates (7a, 7b) in the first region α are pressed against each other.

In the present preferred embodiment, the second clutch 4b includes the divider 4bb dividing the driving clutch plates (6a to 6c) and the driven clutch plates (7a to 7c) in the axial direction such that the first region α adjacent to the clutch pressure plate 5 and the second region β adjacent to the centrifugal clutch 9 are defined. The second clutch 4b presses the driving clutch plates (6a to 6c) and the driven clutch plates (7a to 7c) in the first region α and the second region β against each other during operation of the centrifugal clutch 9. The second clutch 4b presses the driving clutch plates (6a, 6b) and the driven clutch plates (7a, 7b) in the first region α against each other during operation of the back torque transmission cam. Consequently, the present preferred embodiment is able to freely change transmission capacity during application of an engine brake (i.e., transmission capacity during operation of the back torque transmission cam) without any change in transmission capacity during acceleration (i.e., transmission capacity during operation of the centrifugal clutch 9).

In the present preferred embodiment, when the centrifugal clutch 9 is in operation and the back torque transmission cam is not in operation, the centrifugal clutch 9 and the clutch pressure plate 5 produce a pressing force by which the driving clutch plates (6a to 6c) and the driven clutch plates (7a to 7c) in the first region α and the second region β are pressed against each other. When the back torque transmission cam is in operation and the centrifugal clutch 9 is not in operation, the divider 4bb and the clutch pressure plate 5 produce a pressing force by which the driving clutch plates (6a, 6b) and the driven clutch plates (7a, 7b) in the first region α are pressed against each other. The second clutch 4b includes the divider 4bb in the form of a flange located at any desired position. Consequently, the present preferred embodiment is able to freely change transmission capacity during application of an engine brake without any change in transmission capacity during acceleration.

In the present preferred embodiment, the location of the divider 4bb provided on the second clutch 4b is set in accordance with the transmission capacity of the driving clutch plates (6a, 6b) or the driven clutch plates (7a, 7b) disposed in the first region α and the transmission capacity of the driving clutch plates 6c or the driven clutch plates 7c disposed in the second region β. As used herein, the term "transmission capacity" refers to capacity for transmission of power. Consequently, the present preferred embodiment is able to accurately set transmission capacity during acceleration of the vehicle and transmission capacity during application of an engine brake.

Figure 24:
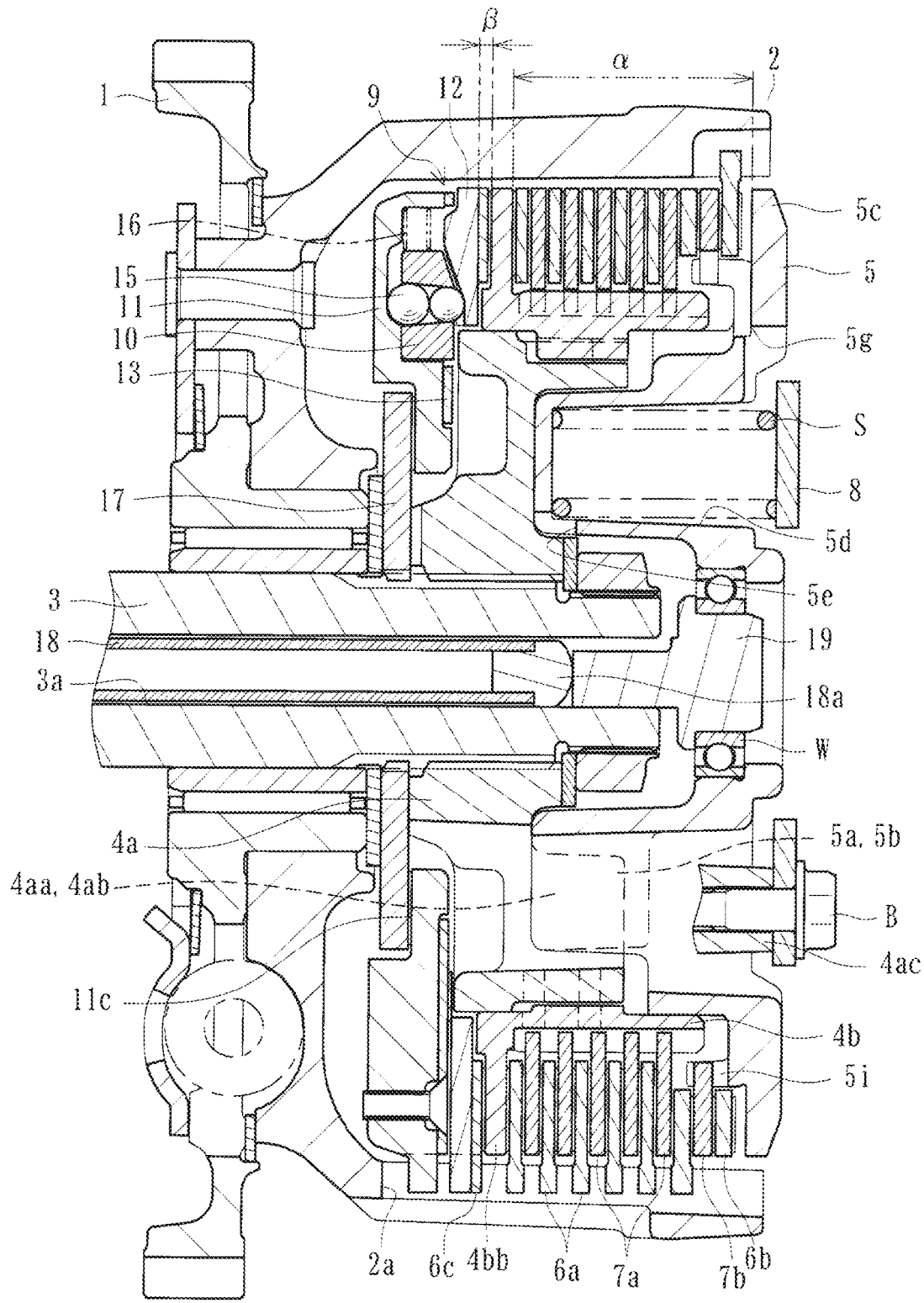
FIG. 24 is a vertical cross-sectional view of a power transmission apparatus according to another preferred embodiment of the present invention.
Figure 25:
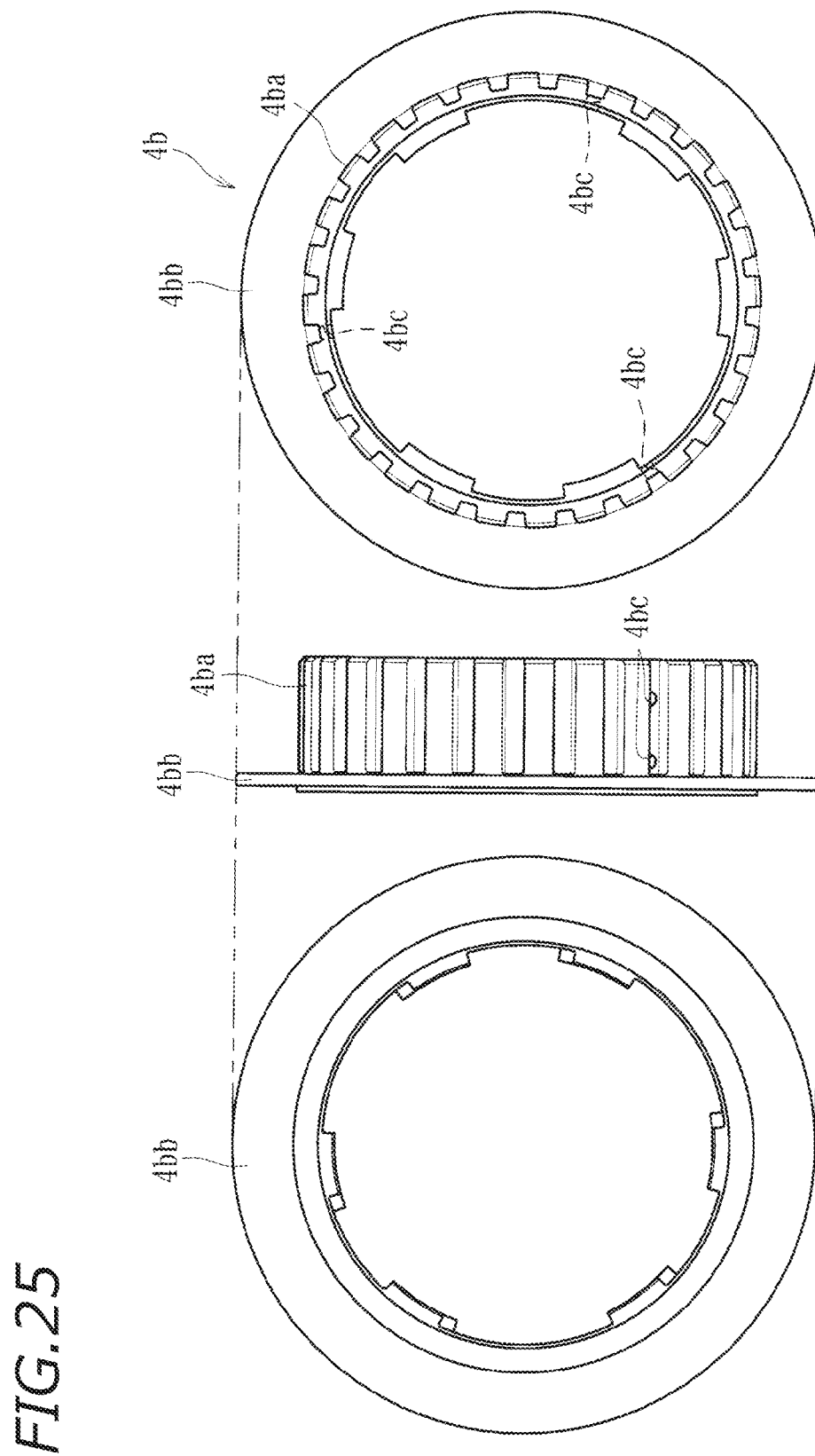
FIG. 25 is a three-view drawing of a second clutch of the power transmission apparatus.

Although the present preferred embodiment has been described thus far, the present invention is not limited to this preferred embodiment. As illustrated in FIGS. 24 and 25, for example, the number of driving clutch plates 6c disposed in the second region β may be one. In this case, when the centrifugal clutch 9 is in operation, the centrifugal clutch 9 is smoothly connectable to the driving clutch plates (6a, 6b) or the driven clutch plates (7a, 7b) in the first region α through the driving clutch plate 6c in the second region β. A sudden connection of the centrifugal clutch 9, which is attached to the clutch housing 2 (i.e., which is disposed on the input side), to the driving clutch plates (6a, 6b) and the driven clutch plates (7a, 7b), which are attached to the second clutch 4b (i.e., which are disposed on the output side), may result in a shock. The interposition of the driving clutch plate 6c, however, enables a smooth connection of the centrifugal clutch 9 to the driving clutch plates (6a, 6b) and the driven clutch plates (7a, 7b).

In the present preferred embodiment, the clutch pressure plate 5 is provided with the fitting portions 5i through which the driven clutch plate 7b is attached to the clutch pressure plate 5. Alternatively, the clutch pressure plate 5 may be provided with no fitting portions 5i, and no driven clutch plate 7b may be attached to the clutch pressure plate 5 (which means that the driven clutch plates may be attached exclusively to the second clutch 4b). In this case, the driven clutch plates 7a are disposed in the first region α, and the driven clutch plates 7c are disposed in the second region β. Power transmission apparatuses according to preferred embodiments of the present invention may find applications as various multiple-plate clutch type power transmission apparatuses for, for example, motorcycles, automobiles, three-wheel or four-wheel buggies, or general purpose machines.

An inventive power transmission apparatus includes a second clutch including a divider dividing driving and driven clutch plates in an axial direction such that a first region adjacent to a clutch pressure plate and a second region adjacent to a centrifugal clutch are defined. During operation of the centrifugal clutch, the second clutch presses the driving and driven clutch plates in the first region and the second region against each other. During operation of a back torque transmission cam, the second clutch presses the driving and driven clutch plates in the first region against each other. The power transmission apparatus of the present preferred embodiment may find applications involving, for example, change(s) in external shape or addition of other function(s).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A power transmission apparatus comprising:
a clutch housed in a clutch housing rotatable together with an input that rotates with a driving force of an engine of a vehicle, the clutch housing having a plurality of driving clutch plates attached thereto, the clutch including a first clutch and a second clutch, the first clutch being connected to an output that is able to rotate a wheel of the vehicle, the second clutch having a plurality of driven clutch plates attached thereto, the driven clutch plates being arranged alternately with the driving clutch plates;
a clutch pressure plate movable between an operating position where the driving and driven clutch plates are pressed against each other so as to enable transmission of the driving force of the engine to the wheel and a non-operating position where a pressing force exerted on the driving and driven clutch plates is released so as to cut off transmission of the driving force of the engine to the wheel;
a centrifugal clutch including a weight movable from a radially inner position to a radially outer position with a centrifugal force produced by rotation of the clutch housing, the centrifugal clutch being operable to, when the weight is located at the radially outer position, press the driving and driven clutch plates against each other so as to enable transmission of the driving force of the engine to the wheel, the centrifugal clutch being operable to, when the weight is located at the radially inner position, release the pressing force exerted on the driving and driven clutch plates so as to cut off transmission of the driving force of the engine to the wheel; and
a back torque transmission cam operable to, when the clutch pressure plate is located at the non-operating position, move the second clutch so as to press the driving and driven clutch plates against each other upon reception of a rotational force generated by the first clutch through the output; wherein
the second clutch includes a divider dividing the driving and driven clutch plates in an axial direction of the output such that a first region adjacent to the clutch pressure plate and a second region adjacent to the centrifugal clutch are defined, the second clutch being operable to press the driving and driven clutch plates in the first region and the second region against each other during operation of the centrifugal clutch and to press the driving and driven clutch plates in the first region against each other during operation of the back torque transmission cam.

2. The power transmission apparatus according to claim 1, wherein
when the centrifugal clutch is in operation and the back torque transmission cam is not in operation, the centrifugal clutch and the clutch pressure plate are operable to produce a pressing force by which the driving and driven clutch plates in the first region and the second region are pressed against each other; and
when the back torque transmission cam is in operation and the centrifugal clutch is not in operation, the divider and the clutch pressure plate are operable to produce a pressing force by which the driving and driven clutch plates in the first region are pressed against each other.

3. The power transmission apparatus according to claim 2, wherein a location of the divider provided on the second clutch is set in accordance with a transmission capacity of the driving clutch plates or the driven clutch plates in the first region and a transmission capacity of the driving clutch plates or the driven clutch plates in the second region.

4. The power transmission apparatus according to claim 2, wherein a number of driving clutch plates in the second region is one.

5. The power transmission apparatus according to claim 1, wherein a total number of driving and driven clutch plates in the first region is larger than a total number of driving and driven clutch plates in the second region.

6. A power transmission apparatus comprising:
a clutch housed in a clutch housing rotatable together with an input that rotates with a driving force of an engine of a vehicle, the clutch housing having a plurality of driving clutch plates attached thereto, the clutch including a first clutch and a second clutch, the first clutch being connected to an output that is able to rotate a wheel of the vehicle, the second clutch having a plurality of driven clutch plates attached thereto, the driven clutch plates being arranged alternately with the driving clutch plates;
a clutch pressure plate movable between an operating position where the driving and driven clutch plates are pressed against each other so as to enable transmission of the driving force of the engine to the wheel and a non-operating position where a pressing force exerted on the driving and driven clutch plates is released so as to cut off transmission of the driving force of the engine to the wheel;
a centrifugal clutch including a weight movable from a radially inner position to a radially outer position with a centrifugal force produced by rotation of the clutch housing, the centrifugal clutch being operable to, when the weight is located at the radially outer position, press the driving and driven clutch plates against each other so as to enable transmission of the driving force of the engine to the wheel, the centrifugal clutch being operable to, when the weight is located at the radially inner position, release the pressing force exerted on the driving and driven clutch plates so as to cut off transmission of the driving force of the engine to the wheel; and
a back torque transmission cam operable to, when the clutch pressure plate is located at the non-operating position, move the second clutch so as to press the driving and driven clutch plates against each other upon reception of a rotational force by the first clutch through the output; wherein the second clutch is operable to press all of the driving and driven clutch plates against each other during operation of the centrifugal clutch and release a pressing force exerted on some of the driving and driven clutch plates during operation of the back torque transmission cam.

7. The power transmission apparatus according to claim 6, wherein the second clutch includes a divider dividing the driving and driven clutch plates in an axial direction of the output such that a first region and a second region are defined, the second clutch being operable to press the driving and driven clutch plates in the first region and the second region against each other during operation of the centrifugal clutch and to press the driving and driven clutch plates in the first region against each other and release a pressing force exerted on the driving and driven clutch plates in the second region during operation of the back torque transmission cam.

* * * * *